(12) United States Patent
Hall et al.

(10) Patent No.: US 11,824,579 B2
(45) Date of Patent: *Nov. 21, 2023

(54) MULTIPLE CHIRP DATA ALIGNMENT WITH EARLY MESSAGE REJECTION FOR CHIRP SPREAD SPECTRUM

(71) Applicant: Sure-Fi Inc., Provo, UT (US)

(72) Inventors: David R. Hall, Provo, UT (US); Mark Hall, Smithfield, UT (US); John Robinso, Spanish Fork, UT (US); Warren Willes, Alpine, UT (US)

(73) Assignee: Hall Labs LLC, Provo, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 17/567,017

(22) Filed: Dec. 31, 2021

(65) Prior Publication Data
US 2022/0209814 A1 Jun. 30, 2022

Related U.S. Application Data

(60) Provisional application No. 63/132,650, filed on Dec. 31, 2020.

(51) Int. Cl.
*H04B 1/69* (2011.01)
(52) U.S. Cl.
CPC ....... *H04B 1/69* (2013.01); *H04B 2001/6912* (2013.01)

(58) Field of Classification Search
CPC ................... H04B 1/69; H04B 2001/6912
See application file for complete search history.

(56) References Cited

U.S. PATENT DOCUMENTS

| | | | | |
|---|---|---|---|---|
| 11,101,843 | B1* | 8/2021 | Wild | H04B 1/715 |
| 2019/0312610 | A1* | 10/2019 | Dongare | H04L 27/103 |
| 2021/0234570 | A1* | 7/2021 | Eletreby | H04L 27/144 |
| 2021/0367752 | A1* | 11/2021 | Seller | H04L 7/048 |
| 2022/0209813 | A1* | 6/2022 | Hall | H04B 1/69 |
| 2022/0247448 | A1* | 8/2022 | Fukuma | H04W 72/04 |

* cited by examiner

*Primary Examiner* — Dac V Ha

(57) ABSTRACT

A chirp spread spectrum (CSS) receiver may reject, based on multiple data alignment chirps that includes an attribute identifier that is a mismatch to one or more preconfigured identifiers, a message early and before fully receiving/decoding the message. The multiple data alignment chirps may enable usage of a larger range of IDs than a single chirp signal. A receiver may receive a sequence of training chirps for symbol alignment followed by multiple opposite chirps for data alignment. Training chirps may be processed through a fast-Fourier transform (FFT) and the resulting values accumulated until a threshold is exceeded. Using symbol alignment from the training chirps, the receiver may decode multiple opposite chirps that indicate data alignment and comprise an encoded identifier. The receiver may reject the message and terminate further message processing based on the encoded identifier being a mismatch to preconfigured identifiers or attributes indicated by the encoded identifier.

20 Claims, 13 Drawing Sheets

US 11,824,579 B2

MULTIPLE CHIRP DATA ALIGNMENT WITH EARLY MESSAGE REJECTION FOR CHIRP SPREAD SPECTRUM

CROSS-REFERENCE TO RELATED APPLICATIONS

The present application for patent claims priority to U.S. Provisional Application No. 63/132,650, filed Dec. 31, 2020, which is assigned to the assignee of the present application and hereby expressly incorporated by reference.

TECHNICAL FIELD

The present disclosure relates to wireless communications using chirp signals and more specifically to data alignment in chirp spread spectrum.

BACKGROUND

Different radio access technologies may be used for communication. For example, some radio access technologies are particularly suited for short range communications (e.g., 0 to 100 meters (m)), such as Bluetooth, while other radio access technologies are particularly suited for medium range communications (e.g., 100 m to 20 kilometers (km)), such as cellular technologies (e.g., 3G, 4G, LTE, 5G NR), and yet other radio access technologies (e.g., chirp-based radio access technologies) are particularly suited for long range communications (e.g., 1 km to 100 km), such as chirp spread spectrum, LoRaWAN, and the like (which utilize the 900 Megahertz (MHz) frequency band, for example).

Wireless channels are typically noisy, which can interfere with wireless communications. The challenges associated with a noisy channel can mitigated in a variety of ways, including increasing transmit power, improving receive signal strength, and through error correction techniques.

SUMMARY

In a first aspect, the disclosure describes a method for data alignment in chirp spread spectrum (CSS). The method comprises: receiving a one or more training chirps from a preamble of a message; processing each of the one or more training chirps using a fast-Fourier transform (FFT) to generate an FFT result; accumulating the FFT results of the one or more training chirps; determining that the accumulated FFT results exceed a detection threshold; determining, based on the one or more training chirps, a symbol alignment; receiving a plurality of opposite chirps from the preamble of the message, wherein each opposite chirp in the plurality of opposite chirps comprises an identifier; determining based on at least one of the plurality of opposite chirps, data alignment; decoding at least one of the plurality of opposite chirps to determine an identifier; and terminating processing of the message when any of the determined identifiers fails to match a predetermined identifier.

In a second aspect, the disclosure provides that each of the one or more training chirps comprises a first chirp signal that varies in frequency using a first pattern.

In a third aspect, the disclosure provides that each of the one or more training chirps is identical.

In a fourth aspect, the disclosure provides that each opposite chirp in the plurality of opposite chirps comprises a second chirp signal that varies in frequency using a second pattern that is orthogonal to the first pattern.

In a fifth aspect, the disclosure provides that each opposite chirp in the plurality of opposite chirps comprises a cyclically shifted version of the second chirp signal, and wherein the cyclically shifting of the second chirp signal encodes the identifier into the opposite chirp.

In a sixth aspect, the method further comprises: processing at least one of the opposite chirps in the plurality of opposite chirps using a fast-Fourier transform (FFT) to generate an FFT result; identifying a data bin associated with the FFT result; and determining the identifier for the opposite chirp based on the data bin associated with the FFT result.

In a seventh aspect, the disclosure provides that the one or more training chirps are processed using a first FFT pipeline.

In an eight aspect, the disclosure provides that the plurality of opposite chirps is processed using a second FFT pipeline that is disparate from the first FFT pipeline.

In a ninth aspect, the disclosure provides that chirp spread spectrum (CSS) receiver may reject, based on multiple data alignment chirps that includes an identifier that is a mismatch to a preconfigured identifier, a message early and before fully receiving/decoding the message.

In a tenth aspect, the disclosure provides a receiver (e.g., a chirp division multiplexing modulator/demodulator) that receives part or all of a preamble comprising a sequence of chirps that are processed through a fast-Fourier transform (FFT) of a chirp pipeline. The values from the FFT may be accumulated (e.g., peaks over average accumulation) until a detection threshold detection threshold is exceeded. The receiver may align its symbol reception based on the received chirps of the preamble and exceeding the threshold In an eleventh aspect, the disclosure provides an opposite-chirp pipeline may align with the chirp symbols and await multiple opposite-chirp chirps, comprising an identifier, after the sequence of chirps to indicate data alignment.

In a twelfth aspect, the disclosure provides rejecting the message based on the identifier in the multiple opposite-chirp chirps.

In a thirteenth aspect, the disclosure provides moving, based on a mismatch of the identifier in the multiple opposite-chirp chirps, to signal acquisition before an end of the message is received.

In a fourteenth aspect, the disclosure provides acquiring, based on a match of the identifier in the multiple opposite-chirp chirps, the payload data.

In a fifteenth aspect, the disclosure provides the identifier indicating attributes of the message, sender, receiver and/or network.

In a sixteenth aspect, the disclosure provides a self-testing block that enables the receiver to provide a self-check that redirects output from a transmit block to a receive block to ensure encoding and decoding are working properly.

In a seventeenth aspect, the disclosure provides a self-testing block that adds signal delay and/or other signal processing to simulate wireless communication.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative, and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Figure 1:
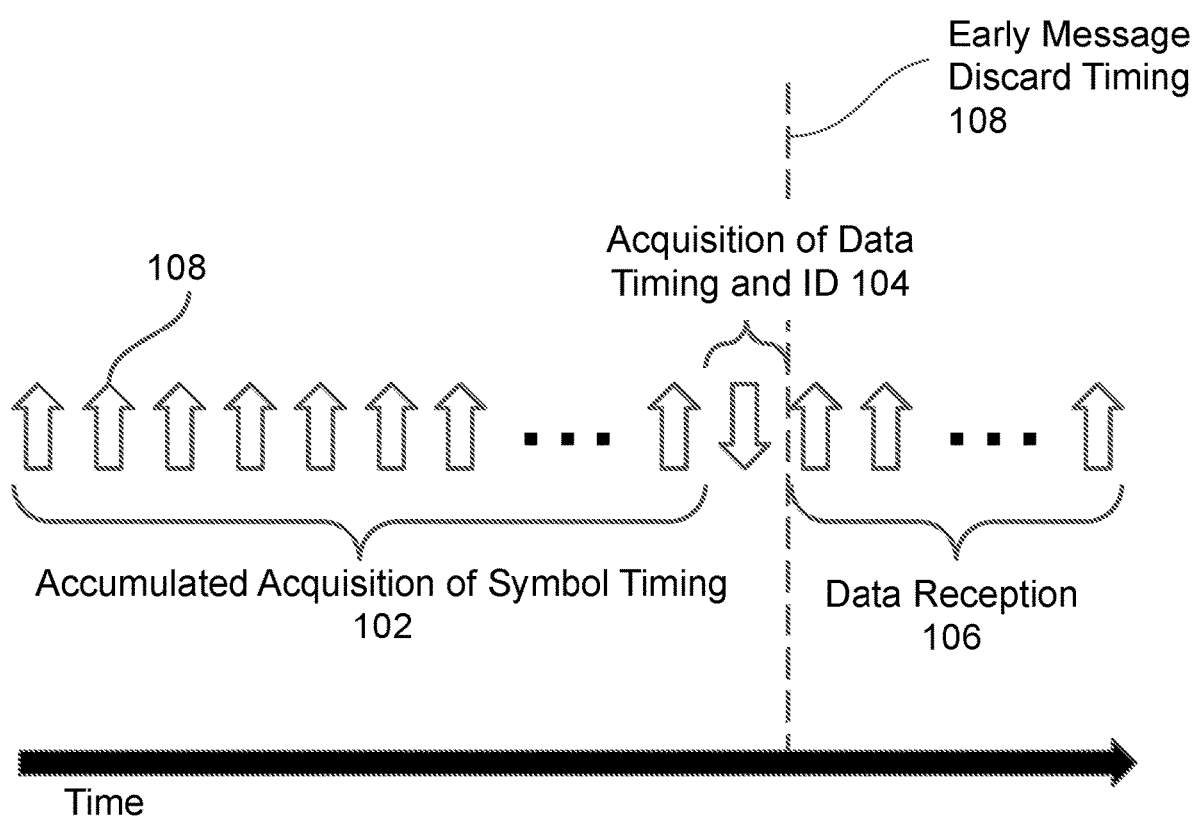
FIG. 1 is a timing diagram of symbol timing acquisition, data timing acquisition, and early message rejection timing of a chirp communications device.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Techniques, apparatus and methods are disclosed that enable early message rejection as part of data alignment in a chirp spread spectrum (CSS) signal based on a data alignment indicator comprising an ID indicated by a multiple opposite chirp signals, enabling usage of a larger range of IDs than a single chirp signal. For example, a receiver (e.g., a chirp division multiplexing modulator/demodulator) may be preconfigured with an identifier that indicates a network and/or related devices. The receiver may receive part or all of a preamble comprising a sequence of training chirps (e.g., 10 up chirps). Training chirps from the preamble may be processed through a fast-Fourier transform (FFT) of a chirp pipeline, and the values from the FFT may be accumulated. The accumulated values from the FFT may exceed a detection threshold detection. The receiver may align its symbol reception based on the received training chirps of the preamble and exceeding the threshold. Using this symbol alignment, an opposite chirp pipeline may align with the training chirp symbols and await multiple opposite chirps after the sequence of training chirps. The multiple opposite chirps may indicate data alignment (e.g., the start of data) and comprise an identifier encoded within the multiple chirps. The identifier may be configured from a larger range of values because the identifier is encoded across multiple chirps (as opposed to a single chirp). In some embodiments, unique identifiers may be used (e.g., for network identification, device origin identification, device receiver identification, etc.). Upon receipt of the opposite chirps, the receiver may start data acquisition on chirps following the multiple opposite chirps. If decoding the identifier from the multiple opposite chirps does not match (e.g., is a mismatch for/to) the preconfigured identifier, the receiver may reject the message before completing the decoding of the data. The receiver may then return to a search for another preamble before decoding an entire message.

The identifier indicated by the data alignment chirps, pipeline arrangement, and accumulated symbol alignment provides advantages. The identifier enables a receiver to reject a message before the message has been fully received and/or decoded. In fact, the message can be rejected shortly after training and acquisition. This early rejection enables a receiver to be more responsive to legitimate messages (e.g., unlock a door earlier, receive a voice packet earlier, etc.) than if the receiver had to receive and/or decode an entire message before determining to accept or reject a message.

The use of multiple chirps enables the identifier to have a larger range. An identifier with a larger range enables more specific addressing of devices and/or networks, especially in higher traffic areas. For example, the identifiers may identify one or more attributes, including a device address, network address, message number, message type, intended receiver address, sender address, command information, request information, priority, etc. Each chirp comprising a portion of the identifier multiplies the range of the prior identifiers. For example, if each chirp has a spreading factor of 11, and the spreading factor enables 2^11 possibilities for each chirp, then a single chirp has a range of 2,048 identifiers, two chirps has a range of 4,194,304 identifiers (2048*2048), and three chirps has a range of 8,589,934,592 identifiers (2048*2048*2048).

The pipeline arrangement and accumulated symbol alignment enables the system to achieve robust symbol alignment in noisy systems while reducing a possibility of missing the multiple down chirps with the identifier. Prior systems relied on two down chirps and a delay of one quarter chirp before data acquisition. These prior systems are estimated to have one in ten false detections and the included delay of two down chirps plus a one quarter downchirp before data acquisition. The embodiments of the receiver enable a robust symbol alignment, a robust data alignment, a reduction in delay (because of better signal acquisition and/or early message rejection) and, in some environments, a reduction in false detection.

In some embodiments, the system comprises a self-testing block that enables the receiver to provide a self-check that redirects output from a transmit block to a receive block to ensure encoding and decoding are working properly. In an embodiment, the self-testing block may add signal delay and/or other signal processing to simulate wireless communication.

It should be noted that explanations and/or examples may be given in terms of up chirps and down chirps. However, it should be recognized that other combinations of up chirps and down chirps are possible, expected and enabled by this specification. For example, FIG. 1 shows a sequence of up chirps to acquire symbol timing, followed by multiple down chirps to acquire data timing, followed by a series of up chirps that comprise the payload of data. This same process can be similarly completed with a sequence of down chirps to acquire symbol timing, followed by multiple up chirps to acquire data timing, followed by a series of down chirps that comprise the payload of data. This same process can be similarly completed with a sequence of down chirps to acquire symbol timing, followed by multiple down chirps to acquire data timing, followed by a series of down chirps that comprise the payload of data. This same process can be similarly completed with a sequence of up chirps to acquire symbol timing, followed by multiple down chirps to acquire data timing, followed by a series of down chirps that comprise the payload of data.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure, and are not meant to be limiting in any fashion. Nor do these phrases indicate any kind of preference for the disclosed embodiment.

As used herein, a chirp means an up chirp or a down chirp. An opposite chirp means a chirp that has an opposite frequency sweep of "a chirp" or "the chirp." For example, an opposite chirp of an up chirp may be a down chirp.

As used herein, the singular forms "a," "an," and "the" include plural referents unless the context clearly dictates otherwise. For example, reference to "a substituent" encompasses a single substituent as well as two or more substituents, and the like.

Bandwidth can be defined as the amount of data that can be communicated in a given time using a given frequency range. Because the frequency of a signal directly impacts the amount of data that can be communicated across the waveform, frequency of the signal becomes the primary determinant of bandwidth of the signal. Because different frequencies have different propagation properties, the choice of frequency also directly impacts the range of the signal. Thus, frequency impacts both bandwidth and range, with progressively lower frequencies generally providing progressively lower bandwidths but progressively longer ranges and with progressively higher frequencies generally providing progressively higher bandwidths but progressively lower ranges. Accordingly, there is typically a tradeoff between range and bandwidth.

Thus, one of the challenges associated with long range wireless communication systems is low data rates (e.g., bandwidth limitations). The bandwidth limitations associated with long range frequency ranges typically limits the types of data that can be communicated using the long-range frequency ranges. For example, voice communication is typically not available using long range frequency ranges due to the bandwidth limitations of long-range frequency ranges. However, better symbol acquisition, better data start acquisition, and/or fewer false positive acquisitions can enable better spreading rates, resulting in higher bit rates that support voice.

Now referring to FIG. 1, FIG. 1 shows a timing diagram of symbol timing acquisition, data timing acquisition, and early message rejection timing of a chirp communications device. A wireless device may receive a sequence of chirps 108 (e.g., packet) comprising a set of training chirps for accumulated acquisition of symbol timing 102, multiple opposite chirps comprising an identifier for data timing 104, and a set of data chirps for decoding for data. A signal representing the training chirps may be processed using an FFT and results of each training chirp accumulated. When the accumulated value rises above a detection threshold, the wireless device may use the detection to setup symbol timing. This enables the wireless device to use the training chirps for symbol timing 102 accumulated acquisition.

As symbol timing is acquired through the training chirps, data acquisition timing (e.g., acquisition of data timing 104) may be acquired next. Multiple opposite chirps may be used to signal a start of data, as symbol timing is complete. At the end of the multiple opposite chirps, acquisition of data timing 104 is complete and reception of data reception 106 starts. The wireless device may decode each data chirp until the end of the sequence of chirps 108 (or packet).

The multiple opposite chirps may comprise an identifier (which may be unique due to the larger range provided by multiple chirps) that indicates messages intended for specified devices and/or networks. The wireless device may be pre-configured with the identifier, such as a network identifier, device identifier, or any combination of characteristics. After determining the symbol timing through receipt of the training chirps, the wireless device may receive and decode the multiple opposite chirps to determine a preamble identifier of the message. If the preamble identifier matches the preconfigured identifier, the wireless device may receive and decode the message, as there is a strong probability that the message is intended for its reception, especially if the identifier is unique. If the preamble identifier does not match the preconfigured identifier, the wireless device may reject the message and return to state that includes waiting for additional messages. This early rejection of the message after preamble, but before data reception and/or decoding enables the wireless device to avoid the full message reception and/or decoding cost in time. In some embodiments without early rejection, the whole message may be received and decoded before rejection, for example, because of encryption and security protocols applied to the data packet.

In some embodiments, an amount of available identifiers may be determined by a spreading factor, symbol size, and/or bandwidth applied to the data alignment chirps (or multiple opposite chirps). For example, each single data alignment chirp may use a spreading factor of 11 that enables 2^11 (or 2048) bins or possible data values (see FIGS. 5-6 and associated description for additional details). As multiple chirps may be combined to form a single identifier in multiplicatively, a range of identifiers may be increased by increasing the number of chirps. For example, a single chirp has a range of 2,048 identifiers, two chirps has a range of 4,194,304 identifiers (2048*2048), and three chirps has a range of 8,589,934,592 identifiers (2048*2048*2048). These different values may be used to enable receivers to be preconfigured to accept only messages comprising preconfigured identifiers among the range of values and reject all other identifiers. These preconfigured identifiers may identify one or more authorized networks, receivers, authorized senders, message types, and/or any combination of attributes.

In some embodiments, a first sequence of chirps 108 are predetermined chirp training symbols, enabling simple timing synchronization (e.g., acquisition of symbol timing 102) without requiring complex clock or oscillator synchronization. This is due to the way in which the chirp preamble pulses (e.g., the chirp symbols in the first sequence of chirps for symbol timing 102) are correlated (known as matched filtering, also known as pulse compression, for example). The compressed pulses (markers, for lack of better terminology) of the preamble are mappable (often quickly and with small computational overhead) to a timing offset between a timing of the transmitter and the receiver symbol (chirp 108) timing.

A preamble (i.e., the first part of the over-the-air packet) may not need a clock training sequence. A receiver may not need a phase lock loop (PLL) and/or spend the time to lock onto and recover the clock timing, for example, after using the accumulated FFT to detect the training chirps. Using chirps may also minimize the time required to cover the possible combinations of frequency and phase shifts a DSSS correlator requires and results in a fast acquisition and low latency. Accordingly, chirp spread spectrum (CSS) systems have an advantage over direct sequence spread spectrum (DSSS) systems in that they require far less local oscillator (e.g., receive clock and transmit clock) precision (e.g., 5 parts per million (ppm)) than do the DSSS based systems (e.g., 40 ppm), which is a cost and hardware advantage.

Figure 2:
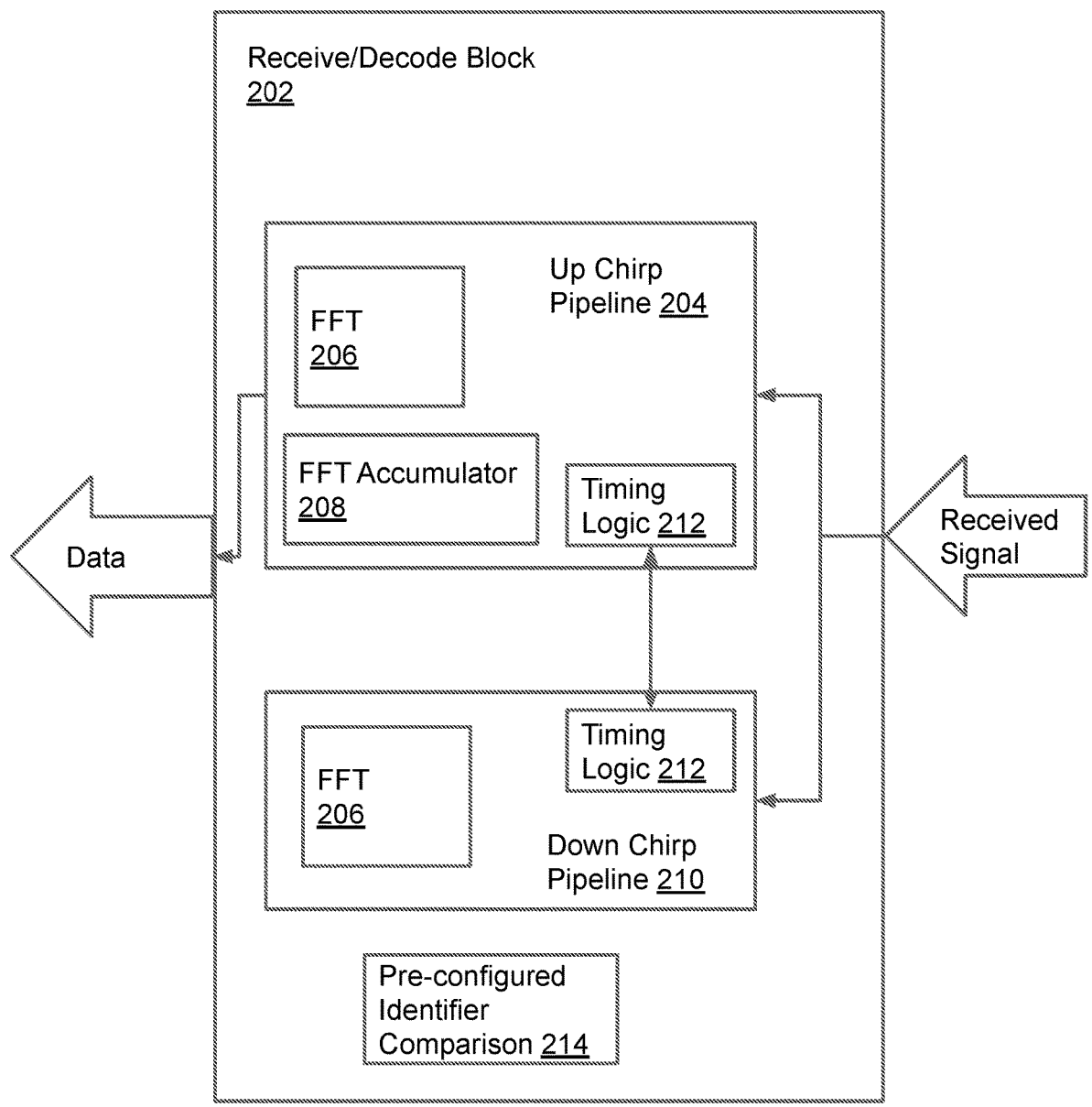
FIG. 2 is a block diagram of a receive block of a chirp communications device.

FIG. 2 shows a block diagram of a receive block of a chirp communications device. A receive/decode block 202 may receive a signal (such as that described in connection with FIG. 1). The signal may be provided to an up chirp pipeline 204 and down chirp pipeline 210. Each pipeline 204, 210 may process a matching chirp and ignore/discard/etc. a non-matching chirp.

In some embodiments, a packet of data comprises a preamble and payload. The preamble comprises a sequence of training up chirps for signal acquisition/detection and symbol timing, followed by multiple down chirps comprising an identifier and indicating data timing. After the multiple down chirps is received that ends the preamble, comprises the identifier, and indicates the start of data, the receive/decode block may determine whether the identifier matches a preconfigured identifier in a comparison block 214. If the identifier matches, a sequence of up chirps are received that may be decoded for data. If the identifier does not match, the message may be rejected early.

A signal representing the preamble may be sent to both the up chirp pipeline 204 and the down chirp pipeline 210. The down chirp pipeline may ignore/reject/discard/etc. non-down chirp signals like the training up chirps of the preamble. The upchirp pipeline may receive the training up chirps and process them through a FFT block 206. Results of the FFT block 206 may be accumulated in an FFT Accumulator 208. The FFT Accumulator may be examined by logic in the up chirp pipeline to determine whether the value in the FFT Accumulator exceeds a signal detection threshold. If so, the up chirp pipeline 204 may use the training up chirps to set up symbol timing (e.g., symbol alignment) in the timing logic 212 and share the symbol timing with the down chirp pipeline 210. After a delay, and/or a reception of a down chirp without the value in the FFT Accumulator 208 exceeding the threshold, the up chirp pipeline may reset, including resetting the FFT Accumulator.

After symbol timing is determined by the receive/decode block 202, the down chirp pipeline 210 may stand ready to receive the multiple down chirps indicating the identifier and data timing (e.g., data alignment). The down chirp pipeline 210 may receive the multiple down chirps and indicate, to the up chirp pipeline, whether to start receiving data (e.g., through timing logic 212) or reset and wait for another message. If the message is indicated to be received, the up chirp pipeline 204 may send the demodulated data along the chain described in FIG. 8 (e.g., to Depacketization 834).

There are advantages of using an identifier, accumulation of FFT results of training chirps, and/or separate pipelines for chirps and opposite chirps. Using an identifier may enable the receive/decode block 202 to reject messages earlier (e.g., after the preamble and/or before data chirps receipt and/or decoding), and/or based on attributes indicated by the identifier. This may enable fewer retries, which result in less latency and/or more throughput (e.g., higher bit rates) as wireless traffic increases.

By using the accumulation of FFT results of training chirps and/or separate pipelines for chirps and opposite chirps, multiple opposite chirps may be used for data timing and false positives may be reduced. Previous systems used multiple opposite chirps and a partial chirp delay. Better symbol acquisition, better data start acquisition, early message rejection/identification, and/or fewer false positive acquisitions can enable better spreading rates and/or higher bit rates including those bitrates that support voice.

It should be noted that FFT 206 may comprise one or more FFTs. For example, a first FFT may process a first downchirp while a second FFT is receiving signal data for processing. In some embodiments, a single pipeline may switch between FFTs to enable processing of each signal in succession. In other embodiments, a pipeline may include a subpipelines that are switched between to receive individual signals (e.g., chirps) and enable sequential processing of chirps (and including an FFT per pipeline). In an embodiment, a pipeline may use a store and forward method to hold samples of a signal to present to a single FFT after processing of the previous signal is complete.

Figure 3:
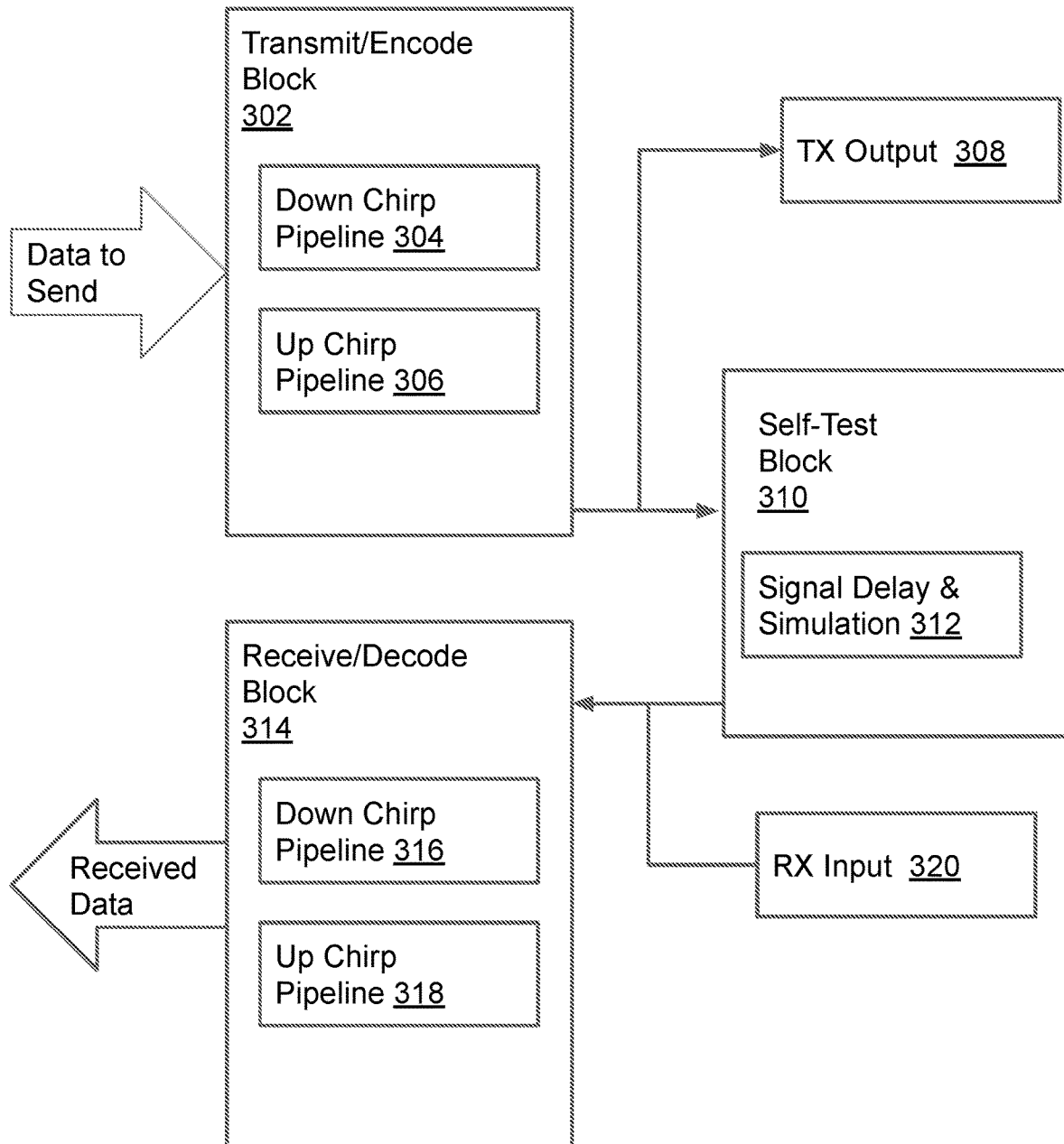
FIG. 3 is a block diagram of a chirp communications device.

FIG. 3 shows a block diagram of a chirp communications device. The chirp communications device may include logic that enables the chirp communications device to perform self-tests and/or simulations. The chirp communications device may comprise a transmit/encode block 302, a receive decode block 314, and a self-test block 310 that couples an output of the transmit/encode block 302 to an input of the receive/decode block 314.

The transmit/encode block 302 may comprise a down chirp pipeline 304 and up chirp pipeline 306. These pipelines 304, 306 may be used to generate a signal, based on data to send, such as shown in FIG. 1. The signal may be coupled to a transmission output 308 that may be upconverted and amplified (e.g., see FIG. 8). The signal may also be routed through the self-test block 310. The self-test block 310 may include signal delay and/or other simulation modifiers that may be applied to the signal from the transmit/encode block 302.

Figure 8:
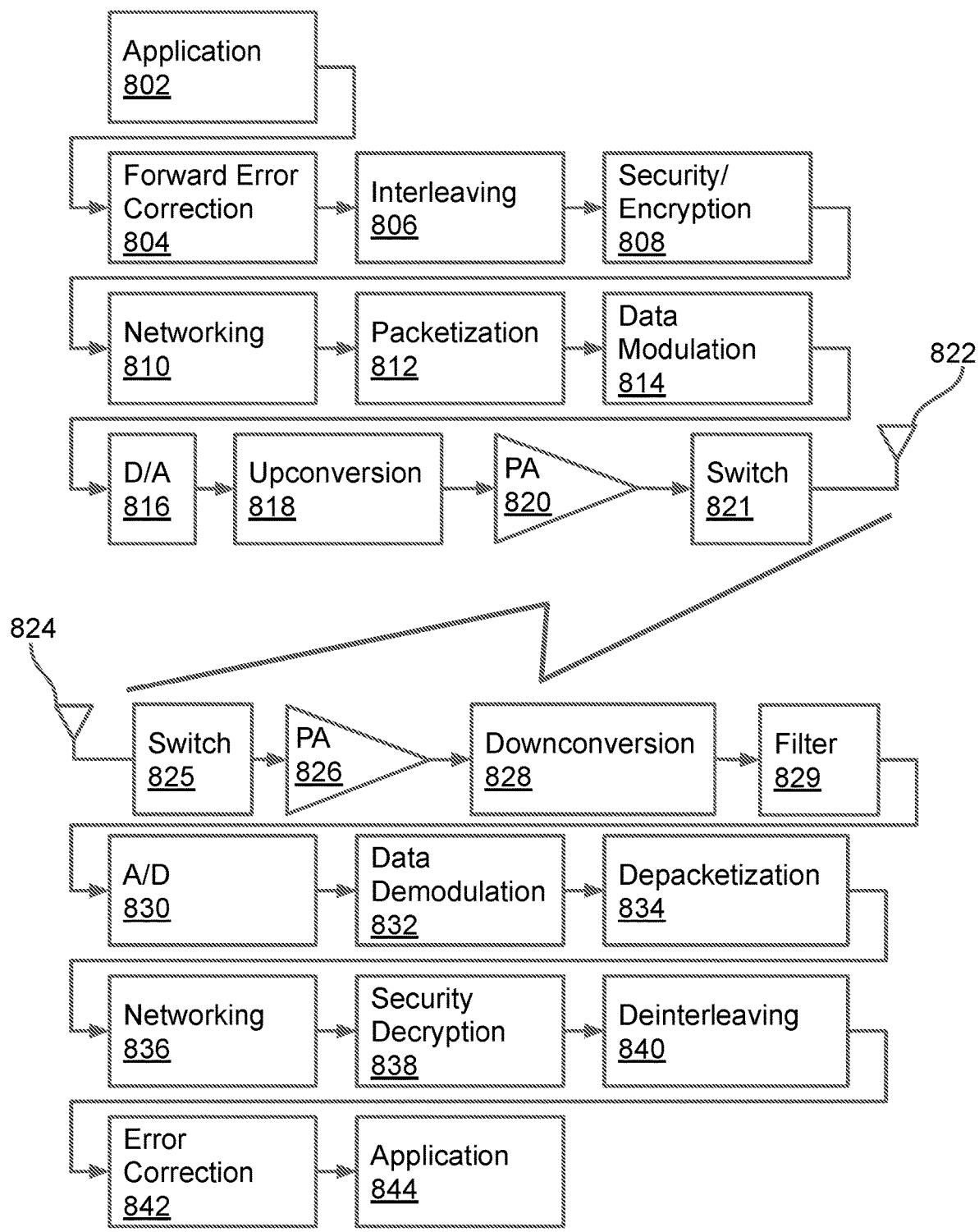
FIG. 8 is a block diagram of a communication chain having both a transmitter chain and a receiver chain.

The receive/decode block 314 may comprise a down chirp pipeline 316 and an up chirp pipeline 318. The receive/decode block 314 may receive a signal (such as the signal described in FIG. 1) from the receiver input 320 and/or self-test block 310. The receive/decode block 314 may decode the signal (e.g., as described in connection with FIG. 2). When not in a self-test situation, the signal may then be coupled to a communication chain (e.g., as shown in FIG. 8) to be further processed (e.g., depacketized or otherwise converted to data usable by application 844). The system may also be used in a self-test in which test data sent to the transmit/encode block 302 and routed through the self-test block 310, may be compared to received data received from the receive/decode block.

The self-test block 310 may enable systems to determine whether the transmission and receipt of signals is operating correctly, identify manufacturing variability, and/or determine internal interference issues. By identifying whether the transmission and receipt of signals is operating correctly, the system can warn of a need of replacement and/or limit of lifespan available before failure. By identifying manufacturing variability, systems can be binned differently for speed, distance, interference resistance, and/or any other advantage or disadvantage. By identifying internal interference issues, the system can narrow down problems, such as if a problem is within the environment around the transmitter or within signal degradation.

Figure 4:
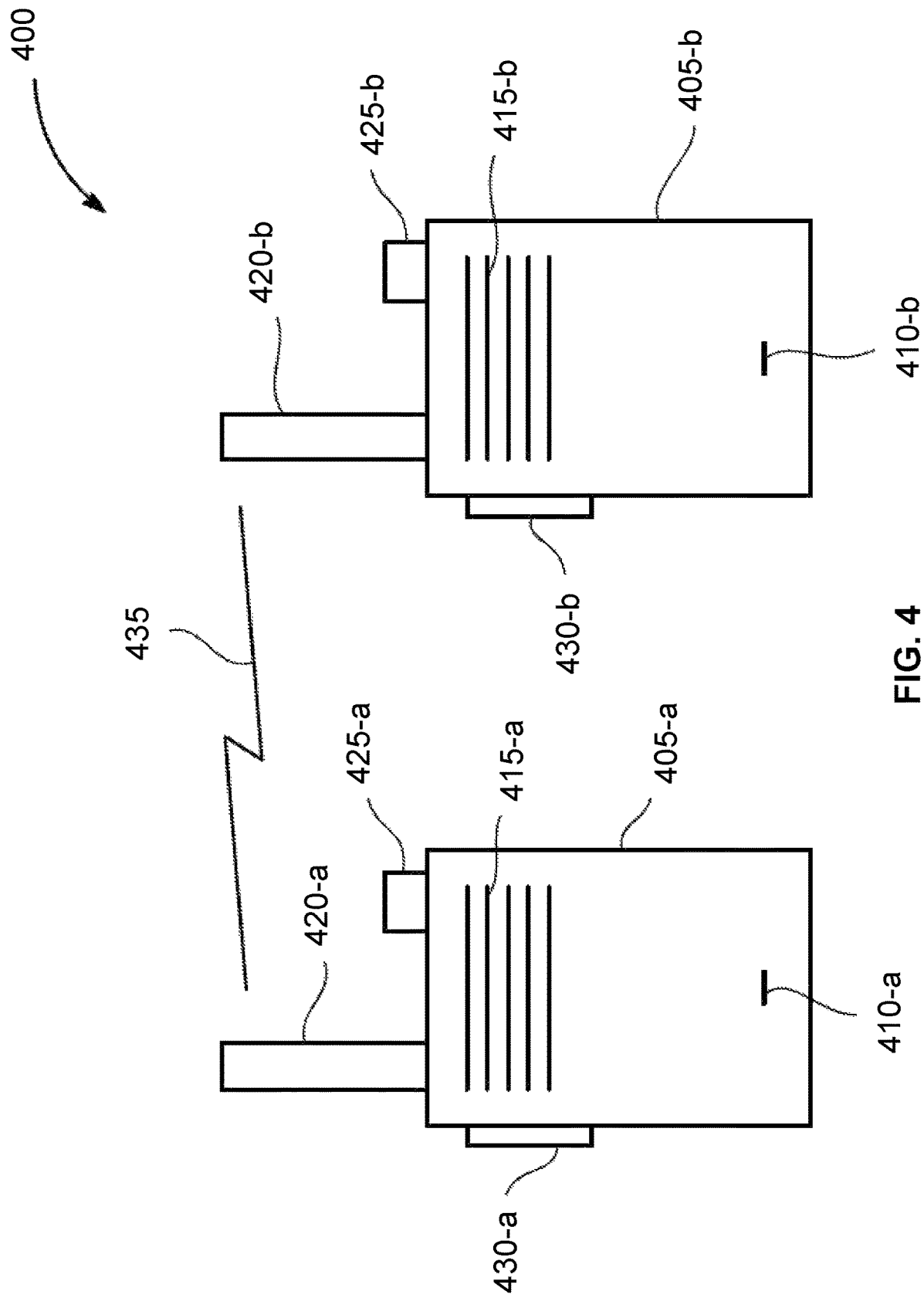
FIG. 4 is a timing diagram of an environment in which the described systems, methods, and devices may be implemented.

FIG. 4 shows a diagram of an environment in which the described systems, methods, and devices may be implemented. The exemplary environment 400 includes a pair of wireless communication devices 405-*a*, 405-*b* (e.g., handheld radios 405-*a*, 405-*b*) that are communicatively connected via wireless communication link 435.

Wireless communication devices 405-*a*, 405-*b* (e.g., handheld radios 405-*a*, 405-*b*) may be any type of wireless communication device. For example, a wireless communication device 405 may be a handheld radio 405-*a*, 405-*b* (as illustrated in FIG. 4, for example), a walkie-talkie, a mobile device, a cell phone, a tablet, a laptop computer, a base station, or a stand-alone bridge device. A wireless communication device 405 (referred to, with regard to FIG. 4, as handheld device 405-*a*, 405-*b*) includes a wireless radio for communicating over the wireless communication link 435. As illustrated, a handheld device 405-*a*, 405-*b* may include a microphone 410-*a*, 410-*b*, a speaker 415-*a*, 415-*b*, an antenna 420-*a*, 420-*b*, a volume selector 425-*a*, 425-*b*, and a push-to-talk button 430-*a*, 430-*b*. Although not shown, a handheld device 405-*a*, 405-*b* may include a processor and memory that enables the function of the handheld device 405-*a*, 405-*b*, including, for example the function of the wireless radio.

In one example, the first handheld radio 405-*a* may receive voice input via the microphone 410-*a*. For instance, a first user may depress the push-to-talk button 430-*a* (to enable the microphone 410-*a*, for example) and may speak into the microphone 410-*a* to produce the voice information. The first handheld radio 405-*a* may code (using linear predictive coding, for example) the voice information received via the microphone 410-*a* to a digital data stream, may code the digital data stream with a forward error correction code to generate a coded data stream. For example, the forward error correction code may be an extended Hamming code that enables single error correction and dual error detection (SECDED). The first handheld radio 405 may generate a transmission signal using chirp division multiplexing for transmitting the coded data stream. The transmission signal may include a preamble comprising a sequence of chirps for symbol alignment and a single opposite chirp for data alignment. The antenna 420-*a* may transmit the transmission signal over the wireless communication link 435 via the antenna 420-*a*.

The second handheld radio 405-*b* may receive a reception signal (e.g., the transmission signal plus noise and/or interference) from the wireless communication link 435 via the antenna 420-*b*. The second handheld radio 405-*b* may accumulate FFT results of one or more of the sequence of chirps. The second handheld radio 405-*b* may determine that the accumulated results exceed a threshold and wait for the data alignment indicated by a single opposite chirp. With the data alignment, the second handheld radio 405-*b* may decode the coded data stream based on the error correction code (e.g., Hamming(32,26)) to obtain a digital data stream. Because an extended Hamming code enables SECDED, in the error correction decoding process, correctable bit errors (e.g., single bit errors) may be corrected and uncorrectable bit errors (e.g., double bit errors) may be detected. The decoded data stream (e.g., digital data stream) may be decoded (using a linear predictive decoder, for example) to obtain the received voice information. The second handheld radio 405-*b* may synthesize the received voice information for playback over the speaker 415-*b*. It is appreciated that the error correction coding and error correction decoding may enable the data stream to be recovered from the received reception signal despite (correctable) bit errors due to the added noise and/or interference.

In this example, the volume of the speaker 415-*b* may be selected via the volume selector 425-*b* and the speaker 415-*b* may play the synthesized voice information. For instance, the synthesized voice information may be played via the speaker 415-*b* so that a second user may physically hear the synthesized voice information (e.g., the speech from the first user). The second user may respond back to the first user using the same procedure discussed with respect to the first user.

Although FIG. 4 illustrates handheld radios 405, which perform all of the described functions in a single device, it is appreciated that the described functions may be spread across multiple devices. For example, the voice capture and voice coding may occur at a mobile device (e.g., a cell phone or tablet) and transmitted to a bridge device (via Bluetooth, for example) which performs the forward error correction coding and chirp division multiplexing. The bridge device may transmit the chirp signal (conveying the parameters of the vocal model, for example) to a second bridge device that performs the receive side chirp division (de)multiplexing and forward error correction decoding. The second bridge device may transmit the coded voice data to a second mobile device, which performs the voice decoding and voice syntheses. It is apparent that different configurations, including a bridge device to a handheld device 405 and vice versa are also possibilities.

Figure 5:
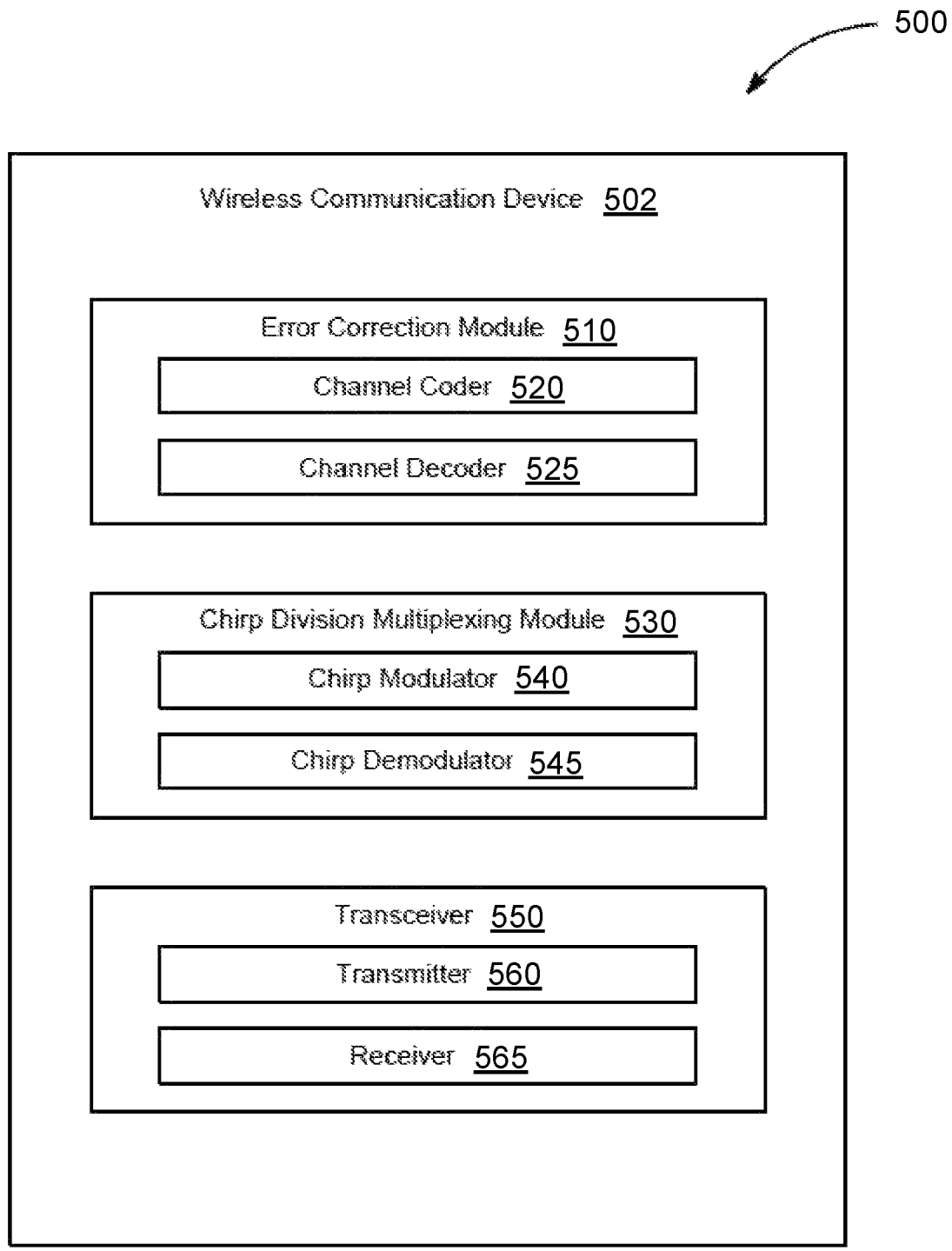
FIG. 5 is a block diagram of a wireless communication device.

FIG. 5 shows a block diagram of a wireless communication device. Wireless communication device 502 is an example of the wireless communication devices 405-*a*, 405-*b* illustrated with respect to FIG. 4. The wireless communication device 502 includes an error correction module 510, a chirp division multiplexing module 530, and transceiver 550.

In some embodiments, all data packet transmissions may include Forward Error Correction (FEC) (via the channel coder 520, for example). FEC is a digital signal processing technique used to enhance data reliability over an unreliable or noisy communications channel by adding redundancy to the data, via an error correcting code (e.g., parity). This allows the receiver (e.g., channel decoder 525) to detect and correct a certain number of errors without the need for retransmission of the message.

The error correction module 510 includes a channel coder 520 and a channel decoder 525. The channel coder 520 encodes a data stream with an error correction code to generate a coded data stream. The error correction module 510 may add one or more parity bits to the data, which adds redundancy and enable certain bit error correction based on the error correction code used. Examples of error correction codes include block codes (e.g., Hamming codes, Reed Solomon codes, Golay codes, Bose-Chaudhuri-Hocquenghem (BCH) codes, Multidimensional parity codes) and convolution codes (e.g., Viterbi codes, BCJR codes, turbo codes, low density parity-check (LDPC) codes). In addition, the error correction module 510 may implement iterative codes (e.g., a concatenation of two or more error correction codes).

Similarly, on the reception side, the channel decoder 525 receives the coded data bits and decode the coded data bits. The channel decoder 525 takes a coded data segment (e.g., corresponding to a unique chirp symbol, chirp codeword) and decodes the coded segment using the selected coding scheme by performing the complimentary function of the channel coder 520. The channel decoder 525 can perform the exact inverse of the process performed by the channel coder 520. In other words, the transmit side and receive side processes may be symmetrical so as to enable (ideally) the data stream to be reliably communicated to the receiver via a wireless channel.

The chirp division multiplexing module 530 implements chirp division multiplexing. Chirp division multiplexing has at its core, Chirp Spread Spectrum, which utilizes chirp pulses for the transmission of each symbol of data. A chirp pulse is a sinusoidal signal whose frequency increases (or decreases) (e.g., linearly) over the duration of the chirp pulse. A single symbol of data is spread over the entire bandwidth of the chirp pulse making it robust to channel noise. The symbol size, the chirp bandwidth, and the spreading rate (based on the Spreading Factor), are all configurable making the technology scalable.

Chirp division multiplexing is characterized by strategic usage of combinations of spreading factors and chirp bandwidth. It is appreciated that different combinations of spreading factors and chirp bandwidth can have similar throughput. For example, the combination of Spreading Factor 12 with a 500 KHz chirp bandwidth has approximately similar throughput as Spreading Factor 11 with 250 KHz chirp bandwidth. It is further appreciated that different Spreading Factors (as implemented, for example) are orthogonal to each other, regardless of the chirp bandwidth being used. Chirp division multiplexing leverages these aspects of orthogonality and similar throughput rates to multiplex different data streams having different spreading factors on the same frequency resources. Accordingly, the chirp division multiplexing module 530 may select a Spreading Factor and a chirp bandwidth size to optimize streaming throughput given the available frequency resources, through the use of chirp division multiplexing. The chirp division multiplexing module 530 may use chirp division multiplexing to optimize streaming throughput of individual data streams as well as maximize available resources (e.g., possible streams) for one or more data streams.

In addition to chirp spreading, the chirp division multiplexing module 530 may also utilize frequency hop spread spectrum signaling to further enhance the robustness to channel noise. The overall effectiveness is seen in chirp division multiplexing's performance in non-line-of sight environments where the communications link is relegated to only multipath signals with no direct signal path to rely on.

In some embodiments, the described systems, methods, and devices operate in the 800 MHz-1000 MHz frequency range (e.g., 902 MHz-928 MHz (the industrial scientific, and medical (ISM) radio band in the U.S., for example), 863 MHz-870 MHz (a license free band in Europe, for example)) and target data rates in the 300 bps to 10 kbps range to allow for maximum range and reliability in that frequency range. In other embodiments, the described systems, methods, and devices may operate in any of a variety of other frequency ranges (e.g., 433.05 MHz-434.79 MHz, 2.4 GHz-2.5 GHz, 5.725 GHz-5.875 GHz, 24 GHz-24.25 GHz, in the ISM radio bands, for example) and target data rates to allow for maximum range and reliability in those respective frequency ranges.

The chirp division multiplexing module 530 includes a chirp modulator 540, and a chirp demodulator 545. The chirp division multiplexing module 530 takes a coded data stream (the output of channel coder 520, for example) and modulates the coded data stream for transmission over a wireless link (e.g., communication link 135). The chirp division multiplexing module 530 may similarly receive a modulated coded data stream from a wireless link (e.g., communication link 135) and may demodulate the coded data stream to provide a received coded data stream (the digital input to the channel decoder 525, for example).

The chirp modulator 540 modulates a fixed length of data or code (e.g., coded data from the channel coder 520) to a chirp symbol that represents that fixed length of data or code (e.g., 128 bits, corresponding to a 32 bit by 32 bit error correction table). The chirp modulator 540 may include a codebook that matches a unique chirp symbol to each possible code in the codebook. In some embodiments the size of the code (e.g., the bit length of the code) may be matched to align with the bit length (e.g., 128 bits based on a 32 bit by 32 bit error correction table) of the coded segment produced by the channel coder 520.

The chirp modulator 540 (e.g., data modulator) matches one or more input coded segments (depending on the bit length of the codes in the codebook being used, for example), which corresponds to a code, to a chirp symbol (e.g., a cyclically shifted version of the chirp signal) that represents the code. The chirp modulator 540 may generate a unique chirp symbol by cyclically shifting the chirp signal so as to correspond to the matched code (the code that corresponds to the one or more input coded segments, for example). It is appreciated that the number of codes may be matched so as to equal the number of possible cyclic shifts of the chirp signal, so that there is a one-to-one relationship between cyclic shifts of the chirp signal (e.g., chirp symbols) and codes in the codebook. The chirp modulator 540 may generate the chirp symbols by cyclically shifting a chirp symbol or using alternative methods to generate a cyclically shifted version (e.g., chirp symbol) of a chirp signal. In some embodiments, the chirp modulator 540 may chain up a sequence of unique chirp symbols (in a manner that creates a continuous transition between chirp symbols, for example) to improve transmission properties associated with transmission in the frequency domain (via transmitter 560, for example).

The chirp demodulator 545 (e.g., data demodulator) demodulates a chirp symbol (e.g., cyclically shifted version of a chirp signal) by matching the cyclic shift to the code from the codebook that corresponds to that cyclic shift. The chirp demodulator 545 uses the same codebook used by the chirp modulator 540. The codebook matches each unique chirp symbol (e.g., each possible cyclic shift of the chirp signal) to each possible code in the codebook. The chirp demodulator 545 detects a unique chirp symbol (using a matched filter, for example) and matches the unique chirp symbol (e.g., unique cyclic shift of the chirp signal) to the code associated with that unique chirp symbol (e.g., unique cyclic shift) based on the codebook to recover the code (the fixed length of data that represents the coded segment, for example). The application of the matched filter results in a high (e.g., greater than 1) BWP in the bucket corresponding to a particular cyclic shift of the chirp signal. The chirp demodulator 545 may use the matched filter to identify each unique chirp symbol (by identifying the cyclic shift associated with the chirp symbol, for example) based on the BWP peak in one of the buckets (corresponding to a specific cyclic shift of the chirp signal, for example).

As discussed in further detail herein, the nature of matched filtering chirp signals/symbols produces very high gain, allowing for easier identification of the cyclic shift associated with each unique chirp symbol, which when identified, can easily be matched to the corresponding code, based on the codebook. In some embodiments the size of the code (e.g., the bit length of the code) may be matched to align with the bit length of the coded segment corresponding to the selected coding schemed (e.g., Hamming(8/4)). The chirp demodulator 545 may produce a sequence of codes (e.g., coded segments) based on a chained sequence of unique chirp symbols.

The transceiver 550 includes a transmitter 560 and a receiver 565. The transmitter 560 includes the wireless communications hardware for transmitting a stream of chained together unique chirp signals. The transmitter 560 may include circuitry, such as amplifiers and antennas to transmit generated chirp signals (symbols generated by the chirp modulator 540, for example). The receiver 565 includes the wireless communications hardware for receiving a stream of chained together, unique, chirp signals.

It is appreciated that the chirp division multiplexing modulation scheme (referred to herein simply as chirp modulation) is both frequency and bandwidth scalable. The Spreading Factor (SF) which determines the number of chips per chirp symbol can be easily be reconfigured as well as the bandwidth occupied by the chirp symbol, even on the fly. These factors are typically chosen from a trade-off between robustness and data bandwidth for given applications. Also, the bandwidth size and number of hopping frequencies are easily configurable which not only helps with efficient use of the allocated frequency band, after adapting to various modulations schemes, but makes it relatively easy to adapt to regional frequency regulations around the world.

Chirp modulation is inherently easily adapted to incorporate frequency hopping spreading in addition to the chirp spreading. This is due to both the packet format/size and the rapid acquisition process described herein. In some embodiments, Frequency Hopping (FH), which is another form of spread spectrum, may be combined with chirp spread spectrum (via the chirp division multiplexing module 530, for example) to further enhance the performance of chirp division multiplexing technology. Chirp division modulation may utilize FH for addition immunity to noise and to add multiple access capability. In some embodiments, 72 pseudorandom, table driven frequencies may be used. In one example, these 72 pseudorandom, table driven frequencies are scalable to adapt to any regional requirement worldwide, or to adapt to symbol bandwidths. Proprietary algorithms may be implemented for table synchronization and adaptation for minimizing frequency dwell time performance per regional regulatory requirements. In some cases, these FH techniques may be referred to as "Spectrum Impact Smoothing."

Inherent to chirp modulation is the ability to multiplex packet transmissions not only based on the time of the chirp, but also based on the properties of the chirp such as rate of frequency change, and phase. The Spreading Factors (SF) mentioned above can be and are chosen such that they are orthogonal to each other (enabling chirp division multiplexing, for example). This means that multiple chirp bursts with different SFs can be transmitted simultaneously on the same frequency and received simultaneously, where the receivers are tuned to the specific SF, without colliding or needing to be retransmitted. Each receiver "matched filter" will only detect the burst to which it is tuned based on SF. This not only creates an opportunity for multiple access to aid in networking but also for different node types to operate adjacently without congesting the RF space.

Figure 6:
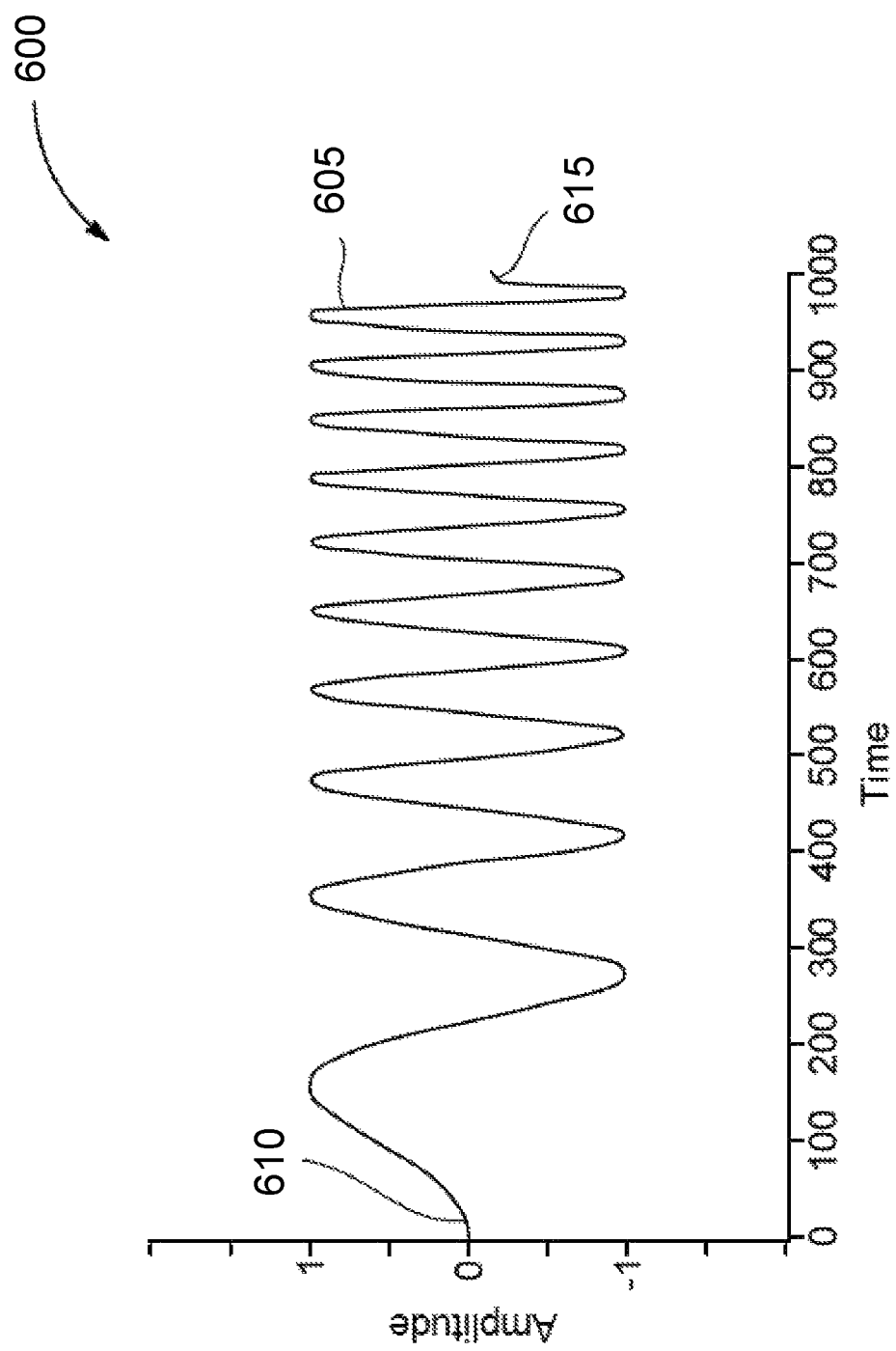
FIG. 6 is a graph of a chirp waveform.

FIG. 6 shows a graph of a chirp waveform. As used herein a chirp symbol is a cyclically shifted version (including no cyclic shift, for example) of the chirp signal 605 (e.g., the chirp waveform 605). The chirp waveform 605 includes changing frequency content (e.g., increasing frequency content (e.g., up chirp) or decreasing frequency content (e.g., down chirp)) over time and begins at a first frequency 610 and ends at a second frequency 615. The chirp waveform 605 illustrated in FIG. 6 is a linear up chirp and the frequency content increases linearly between the first frequency 610 and the second frequency 615. Although a linear up chirp waveform 605 is shown, it is appreciated that a chirp waveform 605 may take any of a variety of forms (e.g., down chirp, nonlinear, etc.) without departing from the scope of the described devices, systems, and methods.

In chirp division multiplexing, each chirp waveform 605 consists of two (2) to the power of the selected spreading factor (SF) (i.e., $2^{SF}$) number of incrementing frequency chips (e.g., bins, buckets). This is similar to the chipping rate where each chirp waveform 605 has a chipping rate of two (2) times the spreading factor (i.e., 2*SF), for example. In some embodiments, the incrementing frequency chips are generated by a lookup table and input to a Numerically Controlled Oscillator (NCO). The same NCO can be used by the transmitter (e.g., chirp modulator 540) to generate the transmitted chirp waveform 605 and reused by the receiver (e.g., chirp demodulator 545) to generate a conjugate chirp waveform 605 (e.g., chirp signal) used to multiply against each of the received chirp chips (according to clocks of the chipping rate clock, for example). This product of the conjugate chirp waveform 605 multiplied by each received chirp chip is stored and run through a Fast Fourier Transform (FFT) processor. It is appreciated that the use of a linear chirp signal allows for a special (i.e., simplified) case of cross correlation which is accomplished via the matched filtering. When a received preamble chirp waveform 605 or data chirp waveform 605 is found in the product, one of the FFT bins will be significantly larger in value than any other (i.e., BT>>1). The specific bin number will correlate directly to the TX/RX timing offset for a preamble chirp waveform 605 and will correlate directly to a data value for a data chirp waveform 605 (a form of pulse position modulation, for example). The number in the largest bin corresponds with the time-bandwidth (BT) product which also corresponds to the energy of the chirp pulse 605. In chirp division multiplexing, the BT product is greater (i.e., much greater) than 1 (e.g., BT>>1). This high BT product ensures reliability and robustness of chirp division multiplexing.

Chirp pulses 605 are unique due to their high spectral energy/density, which makes them very robust and resistant to multipath, noise and other impairments. This is due to the high time-bandwidth product, or BT, associated with chirp pulses 605. In contrast to traditional spread spectrum communication systems where BT is typically smaller than 1 (e.g., BT<1) and inversely proportional to spreading rate (considered as the processing gain, for example), with chirp pulses 605, BT is much larger than 1 and directly proportional to spreading rate (considered as the compression ratio, for example). It is appreciated that, while not precisely accurate, chirped spread spectrum BT can be thought of as the number of frequencies per bit, while standard modulation can be thought of as a number of bits per frequency, which kind of illustrates the odd inverse relationship of their BT.

Because chirp signals 605 have a large time-bandwidth product (BT), during transmission in the channel, both the chirp signal 605 and the noise spread in the wideband. But, at the receiver, the chirp signal 605 produces a pulse peak due to its autocorrelation (via matched filter detection, for example) while the noise is further spread and has relatively small amplitude. This property also contributes to better immunity to jamming, (i.e., narrowband) noise, and multipath impairments. In addition, because the pulse peak has a time duration of 1/B, the higher the time-bandwidth product (BT), the higher the statistical precision in recovering the signal preamble or data and the higher the amount of energy present inside the defined chirp.

Because of the high amount of spectral energy present inside a chirp pulse 605, as evidenced by a high time-bandwidth produce (BT), chirp spread spectrum communications is inherently immune to jamming, (narrowband) noise, multipath, and other impairments. Doppler frequency shifts due to one radio moving relative to the other are relatively insignificant in chirp technology. The overall effect of Doppler is a small shift in the time axis of the received baseband signal. Since the over the air packet is relatively small, the preamble and the data portion of the packet will see the same shift which will automatically be cancelled by the normal receive processing which makes this technology inherently useable in mobile applications.

Figure 7:
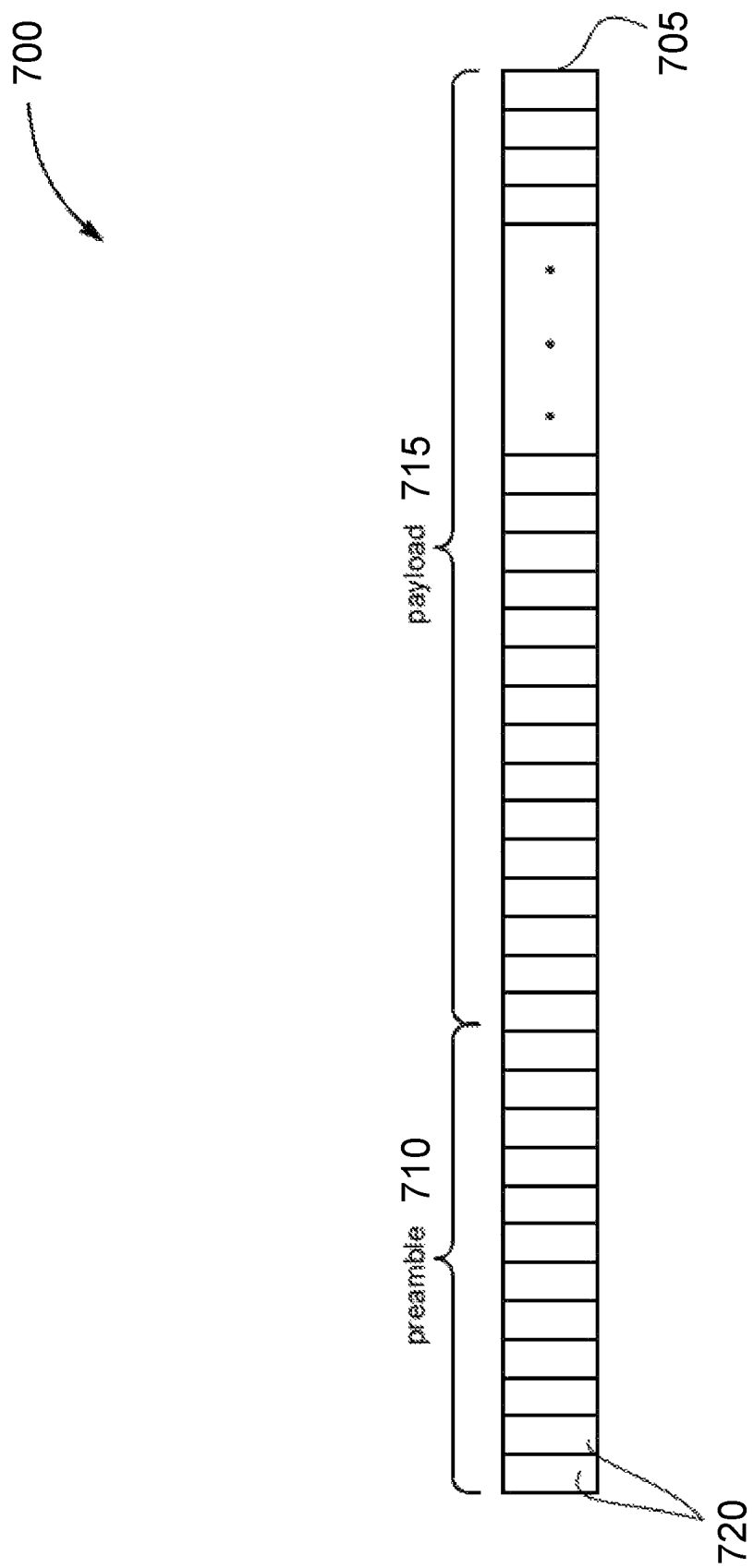
FIG. 7 is a communication frame that may be used with chirp division multiplexing.

FIG. 7 shows a communication frame that may be used with chirp division multiplexing. The communication frame 705 (also referred to herein as communication packet 705) includes a plurality of chirp symbols (e.g., chirp waveform 605) structured in time slots referred to as chirps 720. Each chirp 720 slot may correspond to the time duration of the chirp symbol (e.g., selected chirp bandwidth). The communication frame 705 includes a preamble 710 portion that includes x chirps 720 (including, possibly a partial chirp to allow for receive side timing adjustment, for example) and a payload 715 portion that includes n chirps 720 (depending on the size of the data, for example).

While the preamble 710 (at least the first y chirps 720, for example) may be predetermined (e.g., consists of expected training chirp symbols), the payload 715 includes data with each chirp 720 having one (1) chirp symbol (any of a variety of chirp symbols based on the codebook being used, for example) and must be uniquely detected (via the chirp demodulator 745, for example). In some embodiments, the number of chips 720 in (e.g., length of) the payload 715 is selected to optimize a selected streaming rate.

FIG. 8 shows a block diagram of a communication chain having both a transmitter chain and a receiver chain. The respective transmitter chain and receive chain of the communication chain 800 may each include hardware (e.g., an application processor, a baseband processor, TX/RX receive circuitry, and the like) to implement the modules described herein. Although the transmit and receive chains are shown as independent chains, it is appreciated that the devices implementing these changes may have both transmit and receive capability and certain functions of each respective chain may be combined (as considered above, for example) to optimize hardware resources, battery resources, and the like. Although, not specifically called out, it is appreciated that the respective transmit and receive chains may each be included in a communication device (e.g., communication device 105-c).

The transmitter chain includes an application 802 (e.g., a data source), a forward error correction module 804, an interleaving module 806, a security/encryption module 808, a networking module 810, a packetization module 812, a data modulation module 814, a digital-to-analog converter (DAC, D/A) 818, an upconversion module 816, a power amplifier (PA, but sometimes a low noise amplifier (LNA) may be used) 820, a switch 821 and an antenna 822.

The application 802 (e.g., data source) outputs data (e.g., a stream of data, data stream). The application 802 may be any application or data source that produces/generates/outputs data for transmission. For example, the application 802 may be a messaging (e.g., SMS messaging, email messaging, voice communication) application.

The forward error correction module 804 (e.g., channel coder 520) may code the incoming data stream with an error correction coding scheme (adding redundancy through the use of parity, for example) to improve robustness of the data stream. The result of the error correction coding is a coded data stream. In some embodiments, the forward error correction module 804 may be implemented by a baseband processor.

The interleaving module 806 may interleave the data and/or the coded blocks to randomize the error correction coding. As discussed herein, the interleaving module 806 may be integrated into the forward error correction module 804 and the interleaving module 806 may enable the interleaving based on how (e.g., what direction) the data (or coded data) is loaded into the table and how (e.g., what direction) the coded data (or data) is unloaded from the table. In some embodiments, the interleaving module 507 may interleave the coded blocks using diagonal interleaving.

The security/encryption module 808 may encrypt (or add security to, for example) the coded data stream to secure the coded data stream. For example, the security/encryption module 808 may encrypt the coded data stream using the Advanced Encryption Standard (AES) standard. The security/encryption module 808 converts the coded data stream into an encrypted coded data stream. As security/encryption is optional, the expression "coded data stream" is used, even though the coded data stream may be encrypted (and the coded data stream is actually a ciphered coded data stream, for example) or the coded data stream may be unencrypted (and the coded data stream is, in fact, the uncyphered coded data stream, for example). In some embodiments, the security/encryption module 808 may be implemented by a baseband processor.

The networking module 810 may add networking information to the coded data stream. The networking information includes at least the destination address (e.g., a user ID) of the intended recipient and a sender address (e.g., user ID) of the sender. In some embodiments, the destination address and the sender address may each be represented by a single chirp waveform (e.g., in a single chirp slot). The networking information may be included in the first part of the payload (e.g., payload 715). In some cases, the payload may include one or more blocks (e.g., five (5) blocks) of header information that includes communication details, including networking information, decoding information, interleaving information, frequency hopping information, and the like. In some embodiments, the networking module 810 may be implemented by a baseband processor.

The packetization module 812 may combine a preamble (e.g., preamble 710) with at least a portion of the coded data stream (e.g., a payload 715) to form a packet (e.g., communication frame 705). In some embodiments, the preamble includes X number of training chirps (possibly including a fractional chirp to allow for timing, for example)(e.g., a 12.25 chirp preamble 710). In some embodiments, the packetization module 812 may be implemented by a baseband processor.

The data modulation module 814 (e.g., chirp modulator 540) may generate a chirp symbol (e.g., cyclically rotated chirp waveform 605/chip signal) for each chirp time/bandwidth slot (e.g., chirp 720) in the packet (e.g., communication frame 705) based on the data (e.g., coded blocks, payload) and/or the preamble. In some embodiments, each chirp symbol (corresponding to a particular code in the codebook of available codes, for example) is a cyclically shifted version of the chirp signal (e.g., chirp waveform 605). In such embodiments, the data modulation module 814 may easily generate the chirp symbols using a lookup table and inputting the result of the lookup table to a Numerically Controlled Oscillator (NCO). As discussed herein, the size (e.g., number of buckets/bins) and the duration (e.g., bandwidth) of the chirp waveform is based on a selected spreading factor and a selected bandwidth. The spreading factor and the bandwidth may be selected to optimize/maximize streaming throughput given a particular set of wireless channel conditions.

The data modulation module 814 may chain up the chirp symbols to generate a baseband chirp signal. In some embodiments, the modulation module 814 may adjust the ends of adjacent chirp symbols to generate a continuous waveform (e.g., baseband chirp signal) that includes the contents of the entire packet (e.g., communication frame 705). In some embodiments, the data modulation module 814 may be implemented by a baseband processor.

The D/A 816 converts the baseband chirp signal from a digital signal to an analog signal in preparation for transmission.

The upconversion module 818 may upconvert and/or modulate the baseband chirp signal to a transmission chirp signal for transmission at a desired frequency (e.g., in the 900 MHz range). In one example, the upconversion module 818 may upconvert the baseband chirp signal to 915 MHz, which is the center frequency in the ISM 902 MHz-928 MHz frequency band, by multiplying the baseband chirp signal with the center frequency in the desired frequency. In some cases, the upconversion module 818 may implement a frequency hopping table that enables maximal utilization of the available frequency resources (e.g., one of 72 channels, in the case of 72 available channels, for example).

The PA 820 may amplify the transmission chirp signal for transmission via the antenna 822 (as a transmitted chirp signal, for example). The PA 820 may amplify the power (according to wireless spectrum usage rules, for example) of the transmission chirp signal to maximize propagation distance. The switch 821 may be used for isolation, avoiding leakage, etc.

The transmitted chirp signal, which is transmitted by the transmitter chain may be received by the receiver chain as a received chirp signal. The received chirp signal may include noise and/or interference as a result of being transmitted over a wireless channel.

The receiver chain includes an antenna 824, an PA 826 (but sometimes an LNA may be used), a downconversion module 828, an analog-to-digital (ADC, A/D) 830, a data demodulation module 832, a depacketization module 834, a networking module 836, a security/decryption module 838, a de-interleaving module 840, an error correction module 842, and an application 844 (e.g., data destination).

The antenna 824 of the receiver chain receives the transmitted chirp signal from the transmitter chain. The switch 825 may be used for isolation, avoiding leakage, etc. The PA 826 may amplify the received chirp signal for processing (e.g., demodulation/detection) the received chirp signal.

The downconversion module 828, which performs a complementary (e.g., the inverse) function of the upconversion module 818, may downconvert and/or demodulate the received signal to a baseband signal for processing. In one example, the downconversion module 828 may down convert the received signal from 915 MHz, which is the center frequency in the ISM 902 MHz-928 MHz frequency band, to a baseband chirp signal.

A filter 829 may reduce noise after the down conversion (e.g., bandpass filter, noise rejection, etc.). The baseband signal, which is an analog signal is converted to a digital signal by the A/D converter 830.

The data demodulation module 832 (e.g., chirp demodulator 245), which performs a complimentary (e.g., the inverse) function of the data modulation module 814, may demodulate the baseband signal, by demodulating each chirp symbol (e.g., chirp waveform 605) in each chirp slot (e.g., chirp 720). Data demodulation involves extracting the original information (e.g., the received version of the coded data stream or encrypted coded data stream) from the received chirp waveforms (e.g., chirp symbols). Data demodulation involves identification of the chirp slots (based on the training chirp symbols in the preamble, for example), detection of the chirp symbols within the following chirp slots (e.g., the payload), and matching of the detected chirp symbols with the corresponding code entry based on the codebook, where the resulting codes are the extracted information from demodulating the received chirp waveforms. As discussed with respect to the data modulation module 814, the chirp waveform (e.g., the conjugate chirp waveform used for decoding) is based on the particular combination of spreading factor and bandwidth. In some embodiments, the data demodulation module 832 may be implemented by a baseband processor.

The depacketization module 834, which performs a complimentary (e.g., the inverse) function of the packetization module 812, may take a received packet (e.g., communication frame 705) and separate the preamble (e.g., preamble 710) from the payload (e.g., payload 715). In some embodiments, the depacketization module 834 may be implemented by a baseband processor.

The networking module 836, which performs a complimentary (e.g., the inverse) function of the networking module 810, may read the networking information from the decoded payload. The networking information includes at least the destination address (e.g., a destination identifier) of the intended recipient and a sender address (e.g., sender identifier) of the sender. In some embodiments, the destination address and the sender address may each be represented by a single chirp waveform (e.g., in a single chirp slot). In some embodiments, the networking module 836 may be implemented by a baseband processor.

The security/decryption module 838, which performs a complimentary (e.g., the inverse) function of the security/encryption module 808, may decrypt (or remove security from, for example) the ciphered coded data stream to enable decoding of the coded data stream. For example, the security/decryption module 838 may decrypt the ciphered coded data stream using the Advanced Encryption Standard (AES)

standard. The security/decryption module 838 converts the encrypted coded data stream into an unencrypted coded data stream. As security/encryption/decryption is optional, the expression "coded data stream" is used, even though the coded data stream may be encrypted (and the coded data stream is actually a ciphered coded data stream, for example) or the coded data stream may be unencrypted (and the coded data stream is, in fact, the uncyphered coded data stream, for example). In some embodiments, the security/decryption module 838 may be implemented by a baseband processor.

The de-interleaving module 840 may de-interleave the coded blocks, as discussed herein, to remove the randomization of the error correction coding. As discussed herein, the de-interleaving module 840 may be integrated into the error correction module 842 and the de-interleaving module 840 may enable the de-interleaving based on how (e.g., what direction) the data (or coded data) is loaded into the table and how (e.g., what direction) the coded data (or data) is unloaded from the table. For example, the de-interleaving module 840 (in combination with the error correction module 842, for example) may build a table of coded blocks, putting the received coded blocks into the table in a diagonal fashion and then pulling out of the table either by row or column (complimentary to the way that the interleaving module 806 put the coded blocks into of the table (e.g., by column) so as to produce the properly ordered sequence of coded blocks, for example). In some embodiments, the de-interleaving module 840 may de-interleave the coded blocks so as to undo the output of the interleaving module 806.

The error correction module 842 (e.g., channel decoder 525), which performs a complimentary (e.g., the inverse) function of the forward error correction module 804 (e.g., channel coder 520) may decode the coded data stream with an error correction coding scheme (using redundancy through the use of parity to detect and/or correct errors, for example) to improve robustness of the data stream. Because the error correction coding adds bits (e.g., parity) that enable correction, the decoding process enables and allows error correction on the receive side (i.e., at the error correction module 842). The error correction module 842 may provide the maximum error correction enabled by the forward error correction coding scheme, including techniques such as iterative decoding. The result of the error correction module 842 may be a data stream.

In the case of different coding schemes used within the packet, the error correction module 842 (e.g., decoding module) may utilize different error correction schemes for different portions of the coded data stream. In some cases, extended Hamming codes, which enable single error correction double error detection (SECDED), may be used to detect single our double bit errors and to correct certain single bit errors. In some cases, bit errors (as a result of communication via a noisy wireless channel, for example) may be corrected (using the error correction features of the coding scheme, for example). In other cases, bit errors may be detected, but may not be correctable. In such cases, decisions may be made whether to use data with corrected errors, use data with uncorrected bit errors, or to ignore data with uncorrectable bit errors (and request retransmission, for example). It is appreciated that forward error correction coding in combination with other tactics, such as interleaving, may be used in advanced decoding schemes to further reduce bit errors. For instance, burst errors may be reduced by diagonal interleaving as discussed previously. The result of the error correction decoding is a decoded data stream. In some embodiments, the error correction module 842 may be implemented by a baseband processor.

The application 844 (e.g., data destination) receives data (e.g., a stream of data, data stream) as an input. The application 844 may be any application or data destination that receives/obtains data from a transmission. For example, the application 844 may be a messaging (e.g., SMS messaging, email messaging, voice communication) application.

The same process discussed above may be repeated, going the other direction, for example, to enable two-way communication. It is appreciated that using the described techniques, two-way voice communication may be achieved over a chirp spread spectrum link (using chirp division multiplexing, for example).

Figure 9:
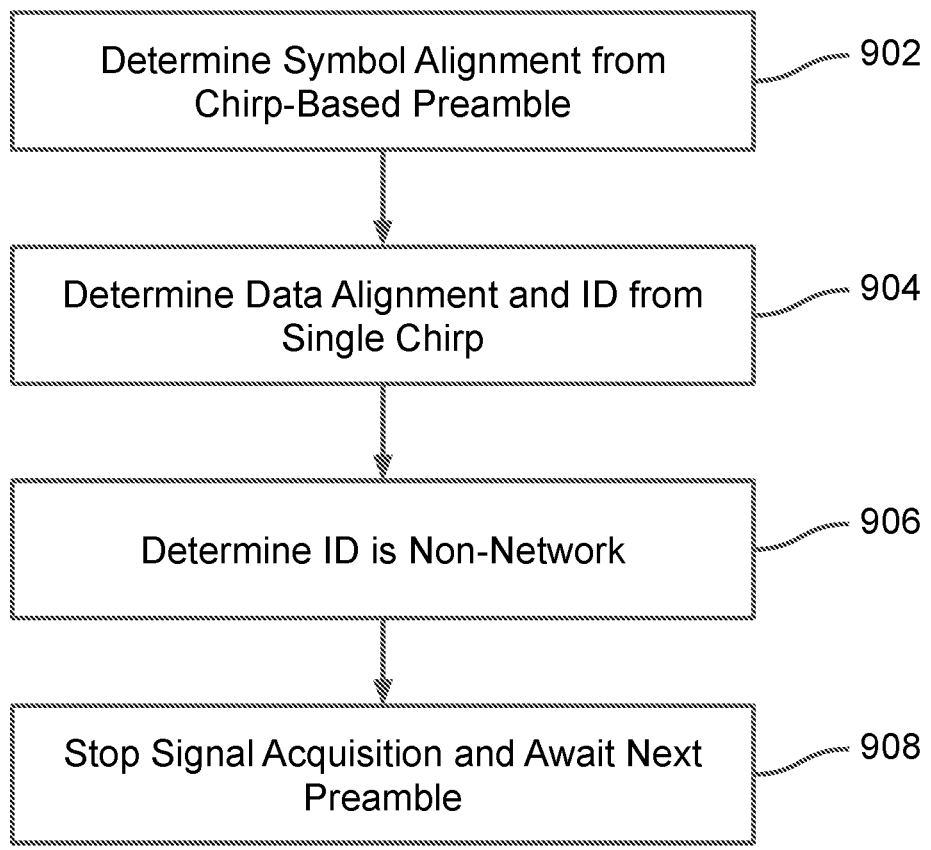
FIG. 9 is a flowchart of a method for multiple chirp data alignment with early message rejection.

FIG. 9 shows a flowchart of a method for multiple chirp data alignment with early message rejection. The method of FIG. 9 may be accomplished by systems such as those shown in FIGS. 2-5 and 8, including receive/decode block 202, transmit/encode block 302, wireless communication device 405, chip division multiplexing module 530, and/or data demodulation module 832. In block 902, a CSS device may determine symbol alignment from a chirp-based preamble. In block 904, a CSS device may determine data alignment and an attribute identifier from multiple opposite chirps. In block 906, a CSS device may determine that the identifier is a non-relevant identifier (e.g., not matching a preconfigured identifier or attribute indicated by the identifier). In block 908, the CSS device may stop signal acquisition and await a next preamble. The CSS device may stop receiving/decoding the message reset the CSS reception chain (e.g., as described in FIG. 8).

Figure 10:
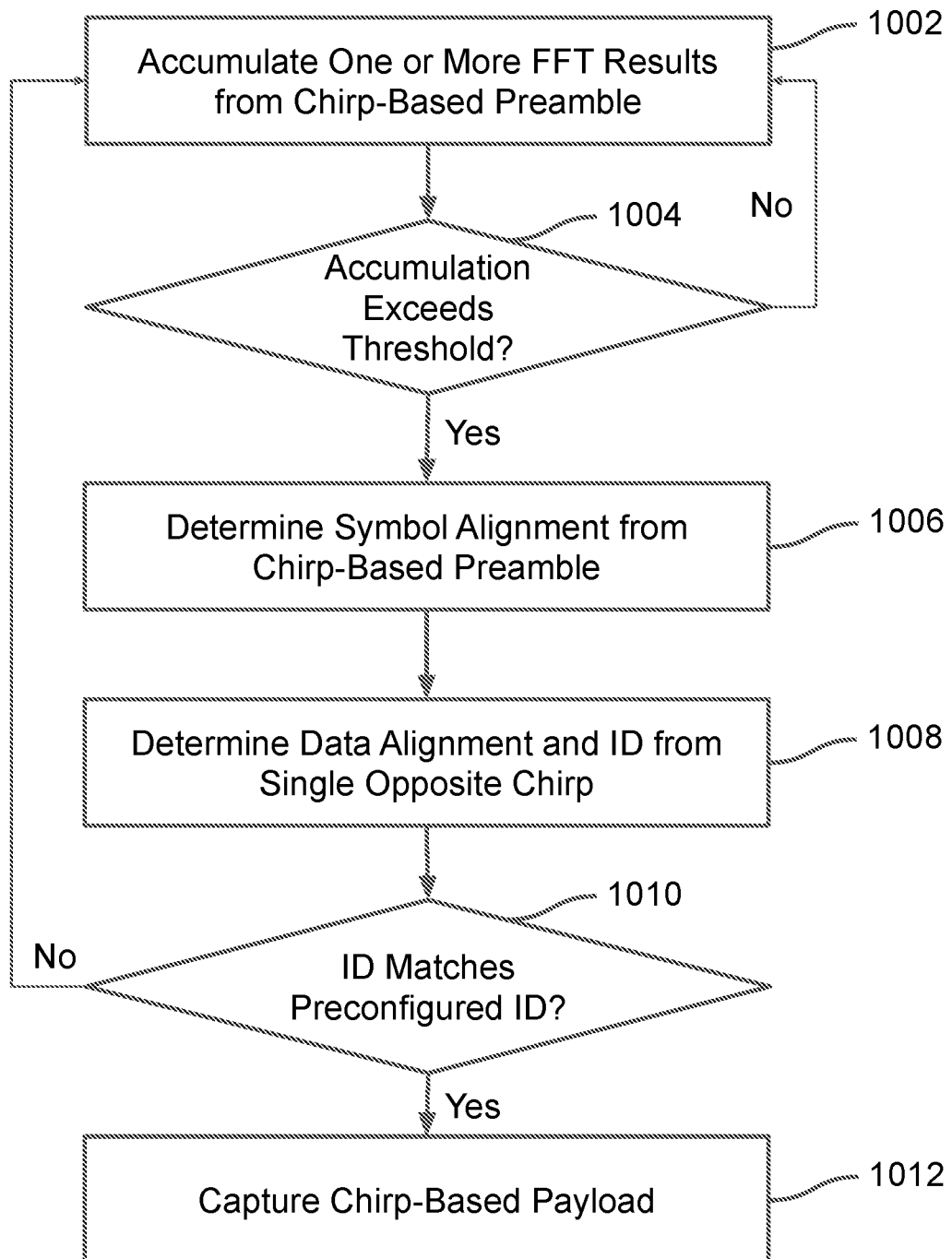
FIG. 10 is a flowchart of a method for multiple chirp data alignment with early message rejection using accumulation for symbol alignment.

FIG. 10 shows a flowchart of a method for multiple chirp data alignment with early message rejection using accumulation for symbol alignment. The method of FIG. 10 may be accomplished by systems such as those shown in FIGS. 2-5 and 8, including receive/decode block 202, transmit/encode block 302, wireless communication device 405, chip division multiplexing module 530, and/or data demodulation module 832. In block 1002, a CSS device may accumulate one or more FFT results from a chirp-based preamble. In block 1004, a CSS device may determine whether the accumulated value exceeds a signal detection threshold. If the accumulated value does not exceed a signal detection threshold, the CSS device may accumulate additional FFT results in block 1002. If the accumulated value does exceed a signal detection threshold, the CSS device may determine symbol alignment from chirp-based preamble in block 1006. In block 1008, a CSS device may determine data alignment and an attribute identifier from multiple opposite chirps. In block 1010, a CSS device may determine whether the attribute identifier matches a preconfigured identifier or attribute. If no, the CSS device may terminate the reception of the message and/or decoding of the message early and return to block 1002. If yes, the CSS device may capture a chirp-based payload in block 1012.

Figure 11:
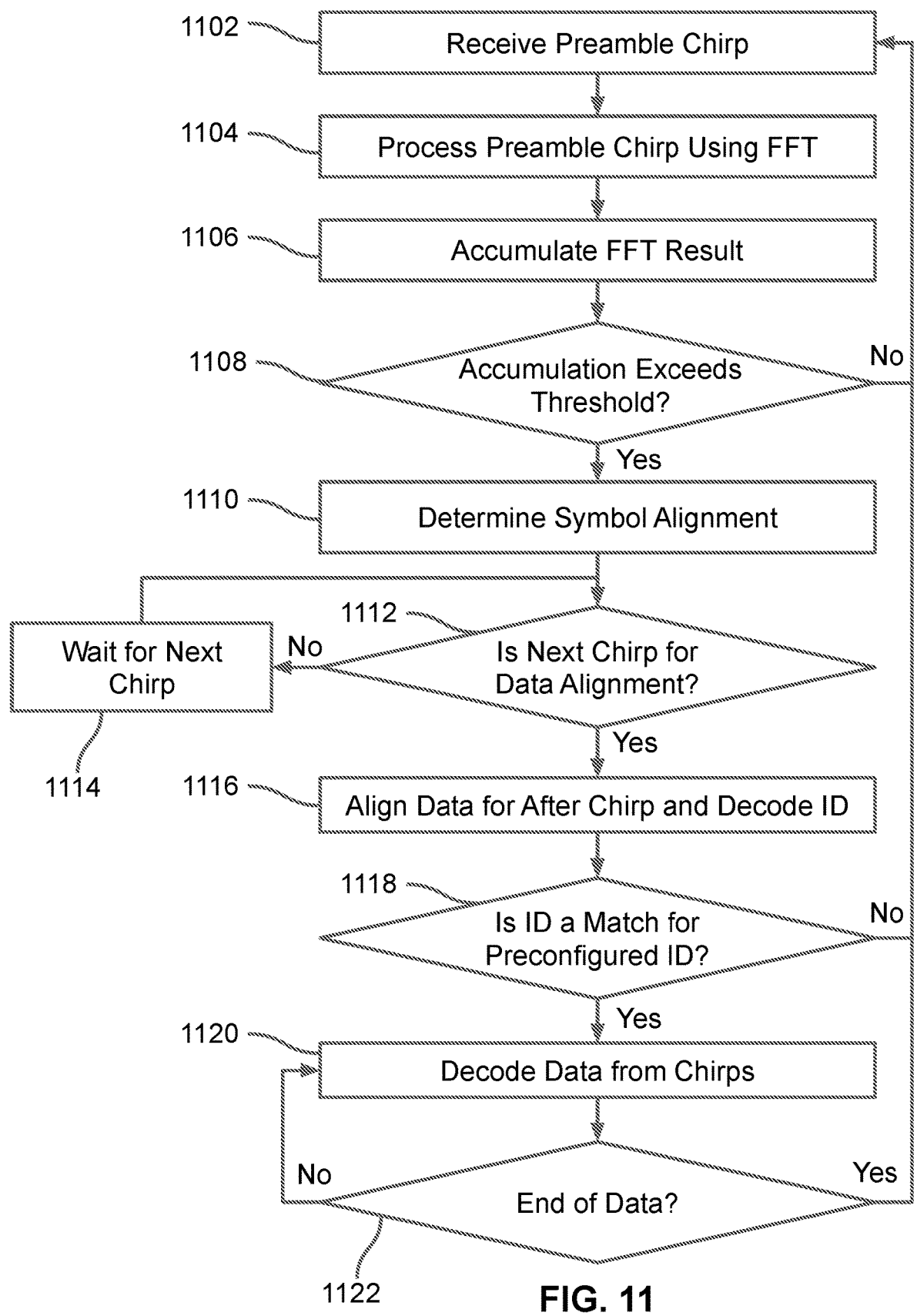
FIG. 11 is a flowchart of a method for accumulated symbol alignment and multiple chirp data alignment with early message rejection.

FIG. 11 shows a flowchart of a method for accumulated symbol alignment and multiple chirp data alignment with early message rejection. The method of FIG. 11 may be accomplished by systems such as those shown in FIGS. 2-5 and 8, including receive/decode block 202, transmit/encode block 302, wireless communication device 405, chip division multiplexing module 530, and/or data demodulation module 832. In block 1102, a CSS device may receive preamble chirp. In block 1104, the CSS device may process a preamble chirp using FFT. In block 1106, the CSS device may accumulate FFT results from received preamble chirps. In block 1108, the CSS device may determine whether the accumulation exceeds a signal detection threshold. If no, then the CSS device may return to block to 1102 receive a preamble chirp. If yes, then in block 1110 the CSS device may determine symbol alignment, for example, based on the received preamble chirps. In block 1112, the CSS device may determine whether the next chirp is a data alignment chirp. If no, then in block 1114, the CSS device may wait for a next chirp and test again in block 1112. If yes, in block 1116, the CSS device may align data start after the multiple data alignment chirps and decode the attribute identifier from the multiple chirps. In block 1118, the CSS device may determine whether the attribute identifier is a match for preconfigured IDs or attributes. If no, the CSS device may terminate receiving/decoding the message early and return to block 1102. If yes, in block 1120, the CSS device may decode data from received chirps. In block 1120, the CSS device may determine whether the end of data has been reached. If no, the CSS device may continue to decode data from chirps in block 1118. If yes, the CSS device may return to await a preamble chirp in 1102.

Figure 12:
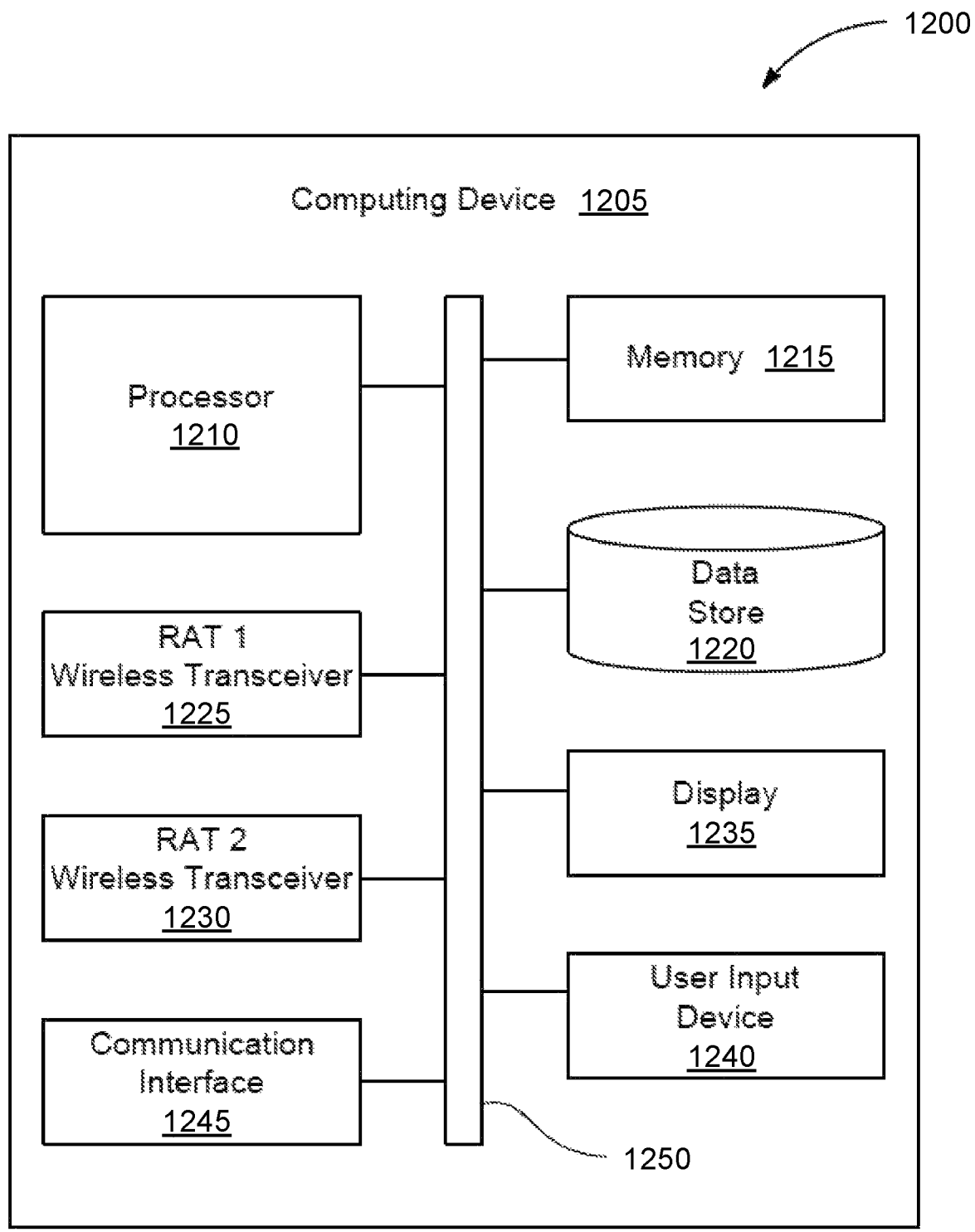
FIG. 12 is a block diagram of a computing device.

FIG. 12 shows a block diagram of a computing device. In some embodiments, the mobile devices 405 (e.g., mobile device 405-*a*, 405-*b*) may be examples of the computing device 1205.

The computing device 1205 includes a processor 1210 (including a general-purpose processor and one or more application specific processors, for example), a wireless transceiver 1225 for communicating via a first RAT (e.g., 3G, 4G, LTE, 5G-NR, and/or LoRaWAN), an optional wireless transceiver 1230 for communicating via a second RAT (e.g., Bluetooth, Wi-Fi), a communication interface 1245 (e.g., serial interface, peripheral component interconnect express), a memory 1215 (e.g., random access memory (RAM), non-volatile RAM (NVRAM)), data store 1220 (e.g., hard disk drive, solid state disk), an optional display 1235 for interfacing with a user, a user input device 1240 (e.g., touch input, mouse, keyboard, pen input), and an interconnect or bus 1250 for interconnecting each of the components 1210-1240.

In some embodiments, the memory 1215 and/or the data store 1220 (each being a non-transitory storage medium, for example) may store instructions that are executable by the processor 1210 to implement the systems and methods described herein. For example, the instructions may be executable by the processor 1210 to implement any of the methods (e.g., methods shown in FIGS. 9-11).

Figure 13:
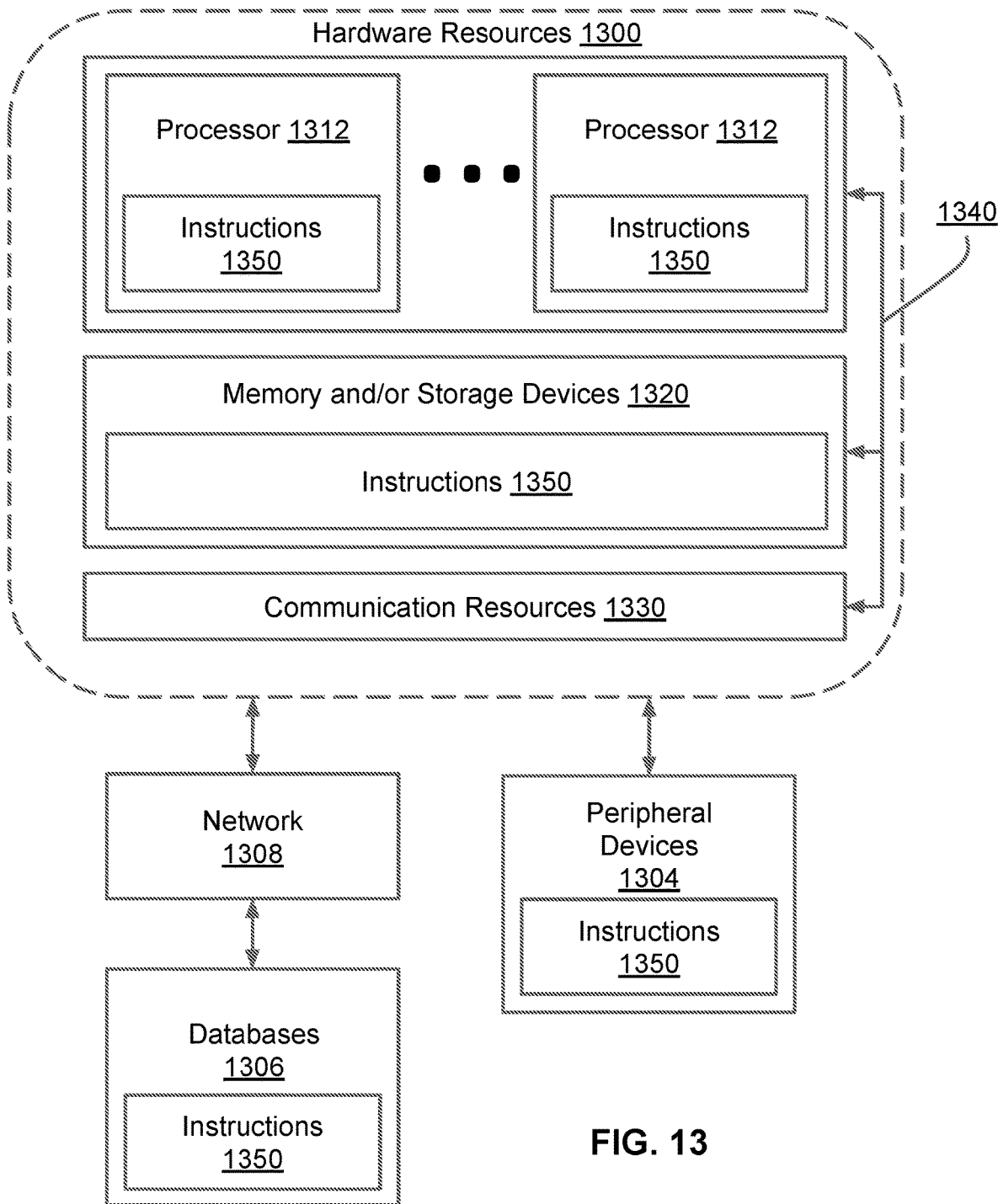
FIG. 13 is a block diagram illustrating a computing system and components.

FIG. 13 is a block diagram illustrating components, according to some example embodiments, able to read instructions from a machine-readable or computer-readable medium (e.g., a machine-readable storage medium) and perform any one or more of the methodologies discussed herein. Specifically, FIG. 13 shows a diagrammatic representation of hardware resources 1300 including one or more processors (or processor cores) 1310, one or more memory/storage devices 1320, and one or more communication resources 1330, each of which are communicatively coupled via a bus 1340.

The processors 1310 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1312 and a processor 1314. The memory/storage devices 1320 may include main memory, disk storage, or any suitable combination thereof.

The communication resources 1330 may include interconnection and/or network interface components or other suitable devices to communicate with one or more peripheral devices 1304 and/or one or more databases 1306 via a network 1308. For example, the communication resources 1330 may include wired communication components (e.g., for coupling via a Universal Serial Bus (USB)), cellular communication components, Near Field Communication (NFC) components, Bluetooth® components (e.g., Bluetooth® Low Energy), Wi-Fi® components, chirp spread spectrum components and other communication components.

Instructions 1350 may comprise software, a program, an application, an applet, an app, or other executable code for causing at least any of the processors 1310 to perform any one or more of the methodologies discussed herein. The instructions 1350 may reside, completely or partially, within at least one of the processors 1310 (e.g., within the processor's cache memory), the memory/storage devices 1320, or any suitable combination thereof.

Furthermore, any portion of the instructions 1350 may be transferred to the hardware resources 1300 from any combination of the peripheral devices 1304 and/or the databases 1306. Accordingly, the memory of processors 1310, the memory/storage devices 1320, the peripheral devices 1304, and the databases 1306 are examples of computer-readable and machine-readable media.

As used herein, the term "circuitry" may refer to, be part of, or include an Application Specific Integrated Circuit (ASIC), an electronic circuit, a processor) shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment of the present invention. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/aspects/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

Those having skill in the art will appreciate that many changes may be made to the details of the above-described embodiments without departing from the underlying principles of the invention. The scope of the present invention should, therefore, be determined only by the following claims.

The invention has been described with reference to various specific and preferred embodiments and techniques. Nevertheless, it is understood that many variations and modifications may be made while remaining within the spirit and scope of the invention.

What is claimed is:

1. A method for data alignment in chirp spread spectrum (CSS) comprising:
    receiving one or more training chirps in a preamble of a message;
    processing each of the one or more training chirps using a fast-Fourier transform (FFT) to generate an FFT result;
    accumulating the FFT results of the one or more training chirps;
    detecting that the accumulated FFT results exceed a detection threshold;
    determining, based on the detection, a symbol timing;
    receiving a plurality of opposite chirps in the preamble of the message using the determined symbol timing, wherein the single opposite chirp is subsequent to the one or more training chirps, and wherein each opposite chirp in the plurality of opposite chirps comprises an identifier;
    determining based on at least one of the plurality of opposite chirps, data alignment;
    decoding at least one of the plurality of opposite chirps to determine an identifier; and
    terminating processing of the message when any of the determined identifiers fails to match a predetermined identifier.

2. The method of claim 1, wherein each of the one or more training chirps comprises a first chirp signal that varies in frequency using a first pattern.

3. The method of claim 2, wherein each of the one or more training chirps is identical.

4. The method of claim 2, wherein each opposite chirp in the plurality of opposite chirps comprises a second chirp signal that varies in frequency using a second pattern that is orthogonal to the first pattern.

5. The method of claim 4, wherein each opposite chirp in the plurality of opposite chirps comprises a cyclically shifted version of the second chirp signal, and wherein the cyclically shifting of the second chirp signal encodes the identifier into the opposite chirp.

6. The method of claim 5, further comprising:
    processing at least one of the opposite chirps in the plurality of opposite chirps using a fast-Fourier transform (FFT) to generate an FFT result;
    identifying a data bin associated with the FFT result; and
    determining the identifier for the opposite chirp based on the data bin associated with the FFT result.

7. The method of claim 1, wherein the one or more training chirps are processed using a first FFT pipeline.

8. The method of claim 7, wherein the plurality of opposite chirps is processed using a second FFT pipeline that is disparate from the first FFT pipeline.

9. A communication device, comprising:
    a wireless radio;
    a processor;
    memory in electronic communication with the processor; and instructions stored in the memory, wherein the instructions when executed by the processor cause the processor to:
        receive one or more training chirps in a preamble of a message;
        process each of the one or more training chirps using a fast-Fourier transform (FFT) to generate an FFT result;
        accumulate the FFT results of the one or more training chirps;

detect that the accumulated FFT results exceed a detection threshold;

determine, based on the detection, a symbol timing;

receive a plurality of opposite chirps in the preamble of the message using the determined symbol timing, wherein the single opposite chirp is subsequent to the one or more training chirps, and wherein each opposite chirp in the plurality of opposite chirps comprises an identifier;

determine based on at least one of the plurality of opposite chirps, data alignment;

decode at least one of the plurality of opposite chirps to determine an identifier; and terminate processing of the message when any of the determined identifiers fails to match a predetermined identifier.

10. The communication device of claim 9, wherein each of the one or more training chirps comprises a first chirp signal that varies in frequency using a first pattern.

11. The communication device of claim 10, wherein each of the one or more training chirps is identical.

12. The communication device of claim 10, wherein each opposite chirp in the plurality of opposite chirps comprises a second chirp signal that varies in frequency using a second pattern that is orthogonal to the first pattern.

13. The communication device of claim 12, wherein each opposite chirp in the plurality of opposite chirps comprises a cyclically shifted version of the second chirp signal, and wherein the cyclically shifting of the second chirp signal encodes the identifier into the opposite chirp.

14. The communication device of claim 13, wherein the instructions are further executable by the processor to:

process at least one of the opposite chirps in the plurality of opposite chirps using a fast-Fourier transform (FFT) to generate an FFT result;

identify a data bin associated with the FFT result; and determine the identifier based on the data bin associated with the FFT result.

15. The computing device of claim 9, wherein the one or more training chirps are processed using a first FFT pipeline.

16. The computing device of claim 15, wherein the plurality of opposite chirps is processed using a second FFT pipeline that is disparate from the first FFT pipeline.

17. A non-transitory computer-readable medium storing instructions that when executed by a processor, cause the processor to:

receive one or more training chirps in a preamble of a message;

process each of the one or more training chirps using a fast-Fourier transform (FFT) to generate an FFT result;

accumulate the FFT results of the one or more training chirps;

detect that the accumulated FFT results exceed a detection threshold;

determine, based on the detection, a symbol timing;

receive a plurality of opposite chirps in the preamble of the message using the determined symbol timing, wherein the single opposite chirp is subsequent to the one or more training chirps, and wherein each opposite chirp in the plurality of opposite chirps comprises an identifier;

determine based on at least one of the plurality of opposite chirps, data alignment;

decode at least one of the plurality of opposite chirps to determine an identifier; and terminate processing of the message when any of the determined identifiers fails to match a predetermined identifier.

18. The computer-readable medium of claim 17, wherein each of the one or more training chirps comprises a first chirp signal that varies in frequency using a first pattern.

19. The computer-readable medium of claim 18, wherein each of the one or more training chirps is identical.

20. The computer-readable medium of claim 18, each opposite chirp in the plurality of opposite chirps comprises a second chirp signal that varies in frequency using a second pattern that is orthogonal to the first pattern.

* * * * *